United States Patent [19]
Holyoak

[11] Patent Number: 5,329,719
[45] Date of Patent: Jul. 19, 1994

[54] FISH RACEWAY APPARATUS AND METHOD

[76] Inventor: H. K. Holyoak, Hwy. 29 North, Alapaha, Ga. 31622

[21] Appl. No.: 28,250

[22] Filed: Mar. 9, 1993

[51] Int. Cl.$^5$ .............................................. A01K 81/04
[52] U.S. Cl. .................................. 43/6.5; 43/100; 119/223
[58] Field of Search .................. 43/6.5, 4, 5, 7, 8, 43/100, 101, 102, 103, 104; 119/223, 239, 208

[56] References Cited

U.S. PATENT DOCUMENTS

| | | | |
|---|---|---|---|
| 1,332,653 | 3/1920 | Wakefield | 43/6.5 |
| 3,237,339 | 3/1966 | Rice | 119/3 |
| 3,951,104 | 4/1976 | Neff | 43/100 |
| 4,198,925 | 4/1980 | Lindbergh | 43/100 |
| 4,228,762 | 10/1980 | Kemp | 119/2 |
| 4,429,659 | 2/1984 | Holyoak | 119/3 |
| 4,876,985 | 10/1989 | Marcum et al. | 119/4 |

*Primary Examiner*—P. Austin Bradley
*Assistant Examiner*—Chuck Y. Mah
*Attorney, Agent, or Firm*—Hopkins & Thomas

[57] ABSTRACT

A floating fish raceway apparatus (10) for raising and harvesting fish in a body of water, the fish raceway apparatus having a frame (11), a flexible mesh cage (12) depending from the frame (11) and forming an enclosure for raising the fish, and a harvesting means (14) for drawing the flexible mesh cage (12) together in order to draw the fish to one end of the fish cage (10) for easy retrieval from the cage (10).

20 Claims, 19 Drawing Sheets

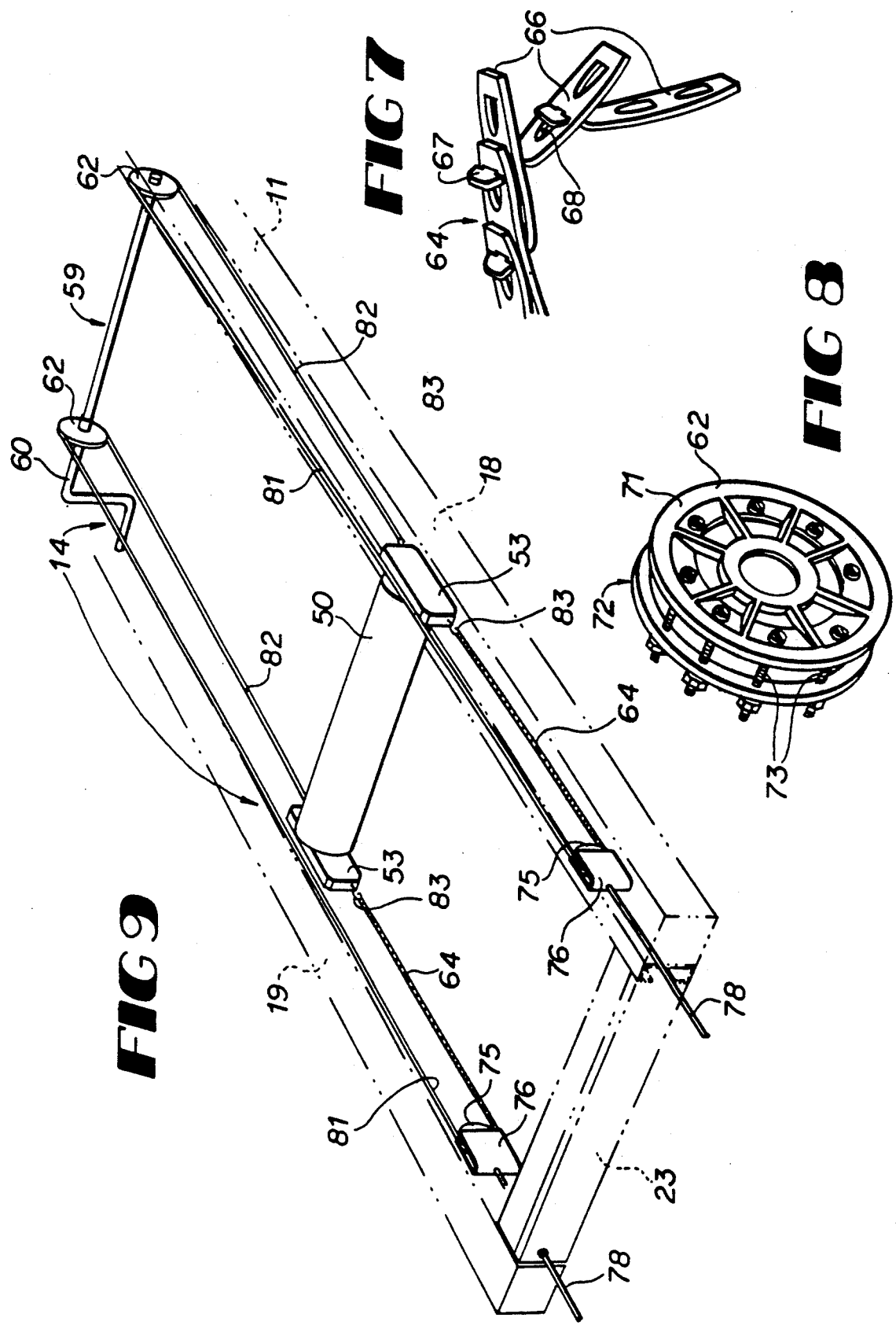

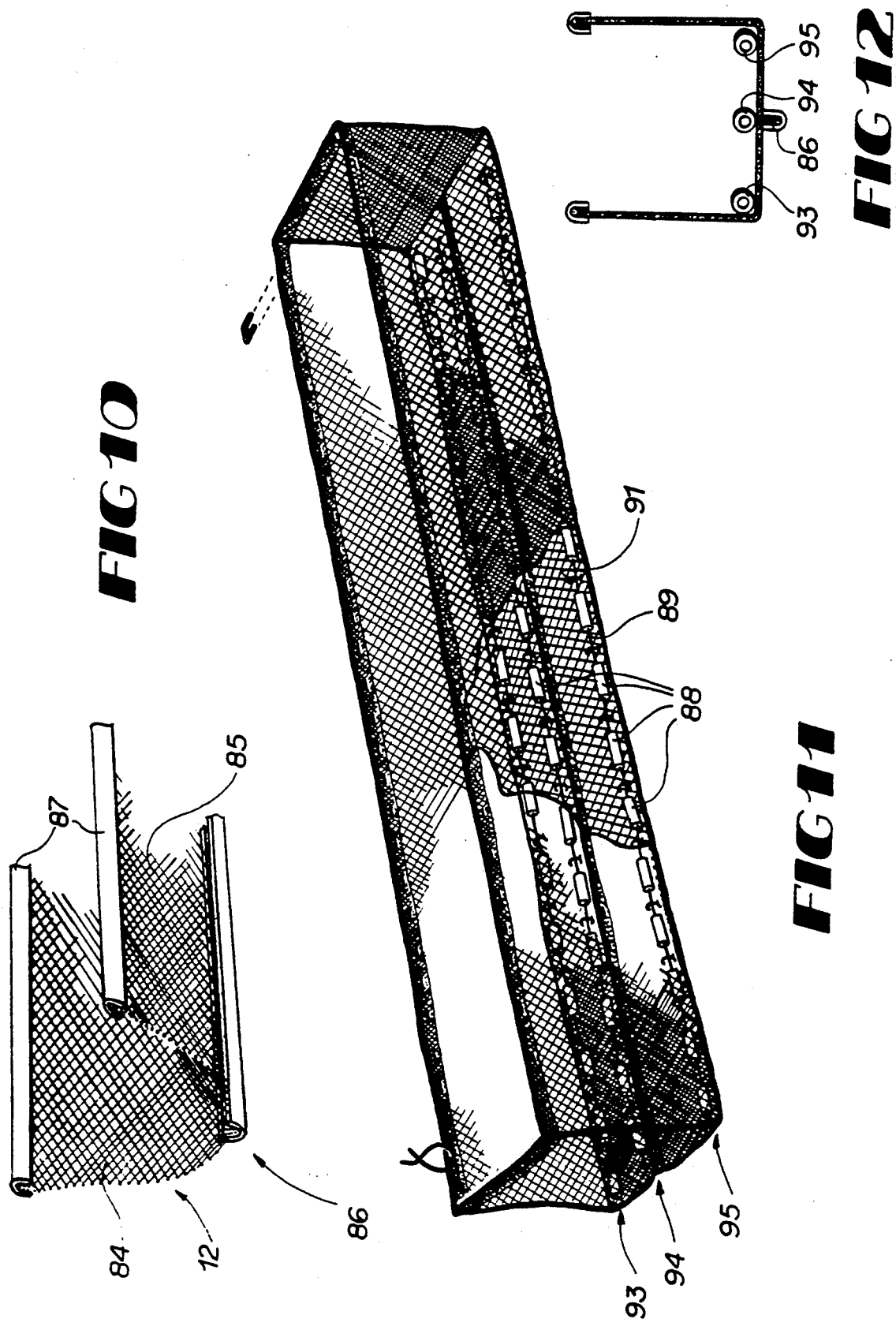

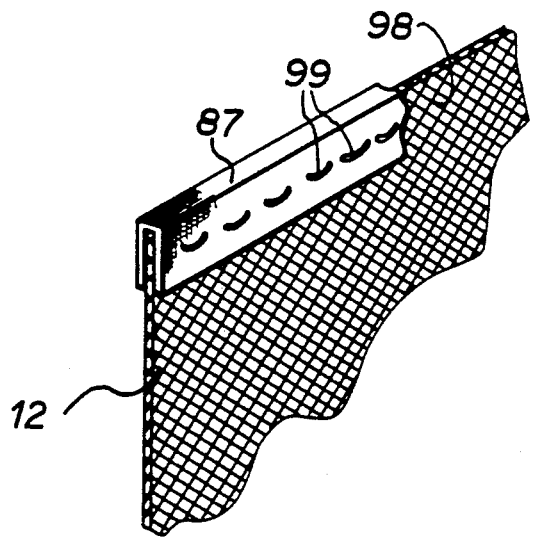
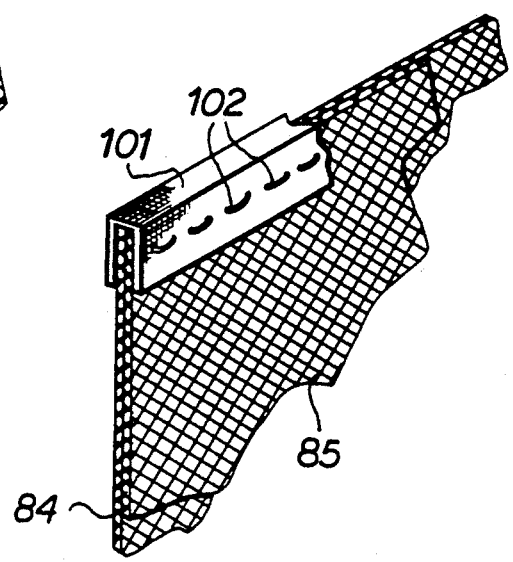
FIG 13  FIG 14
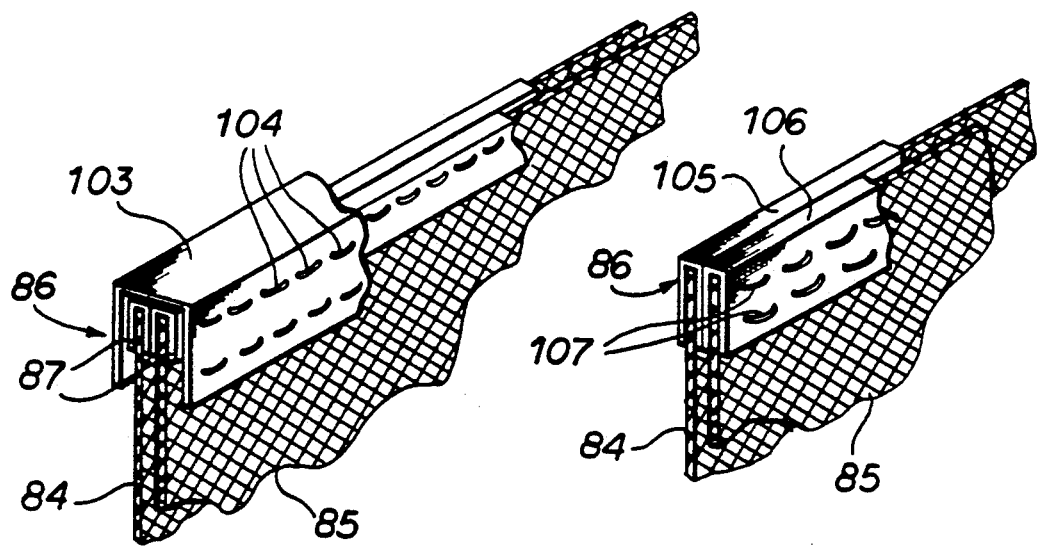
FIG 15  FIG 16

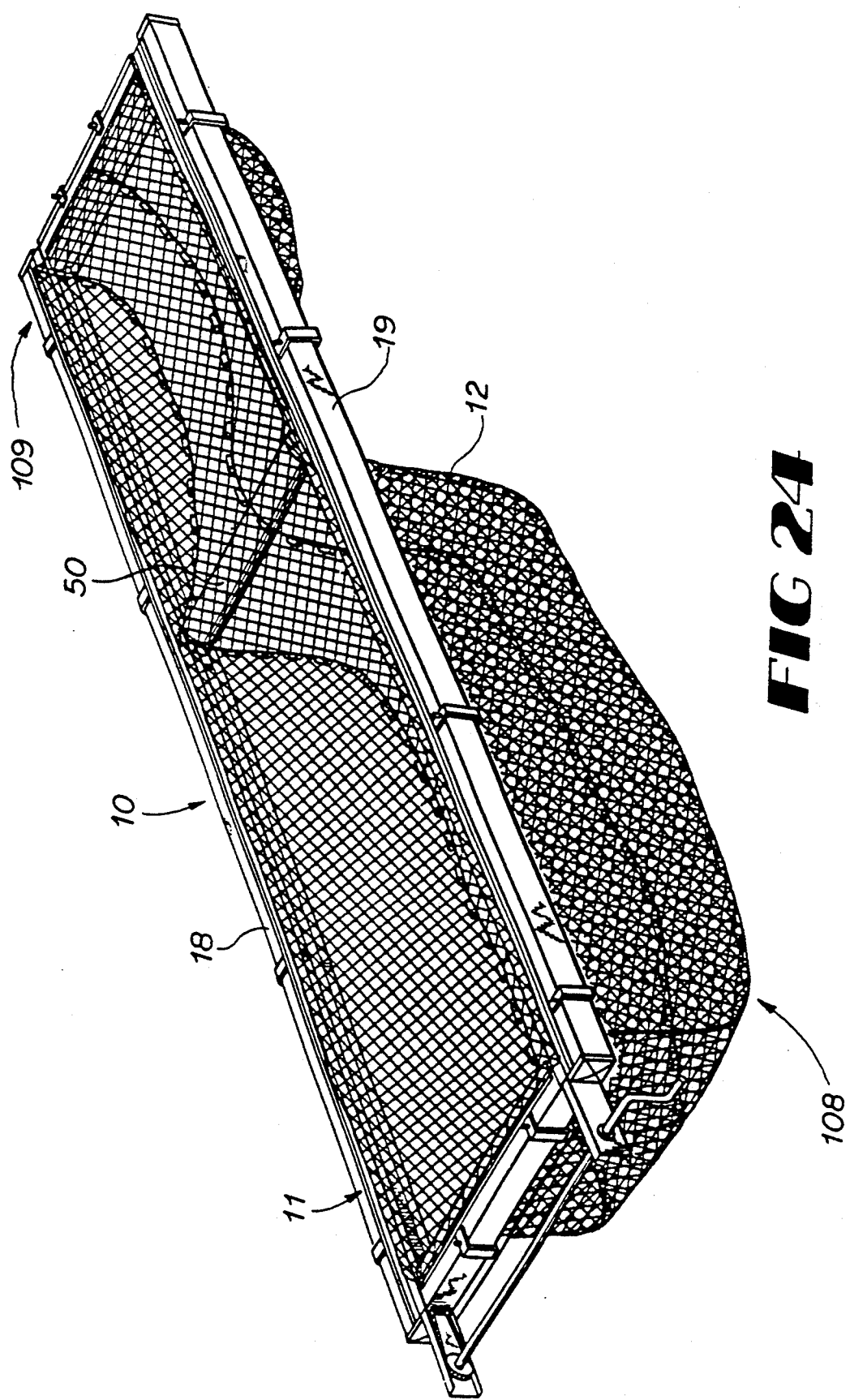

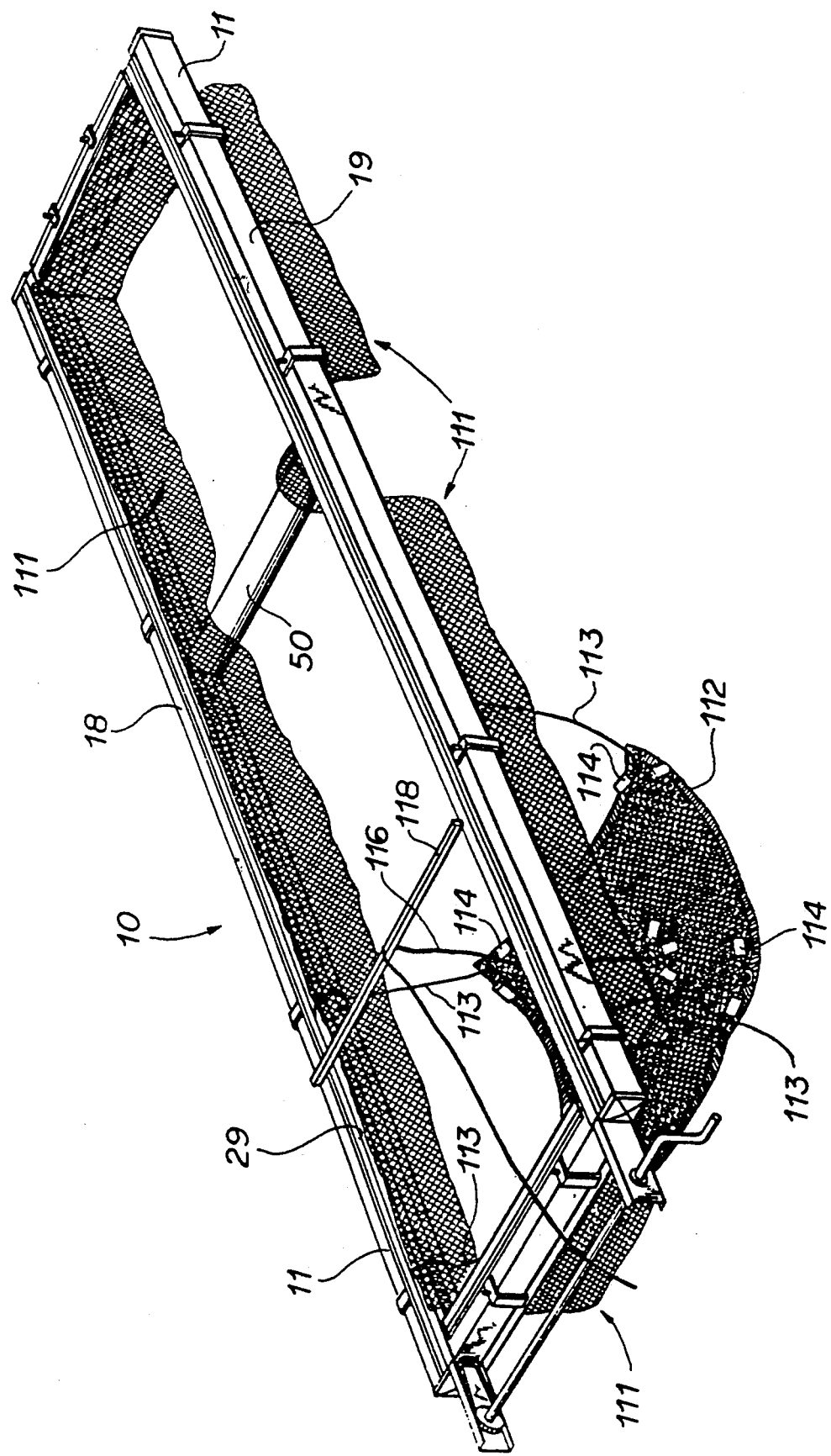

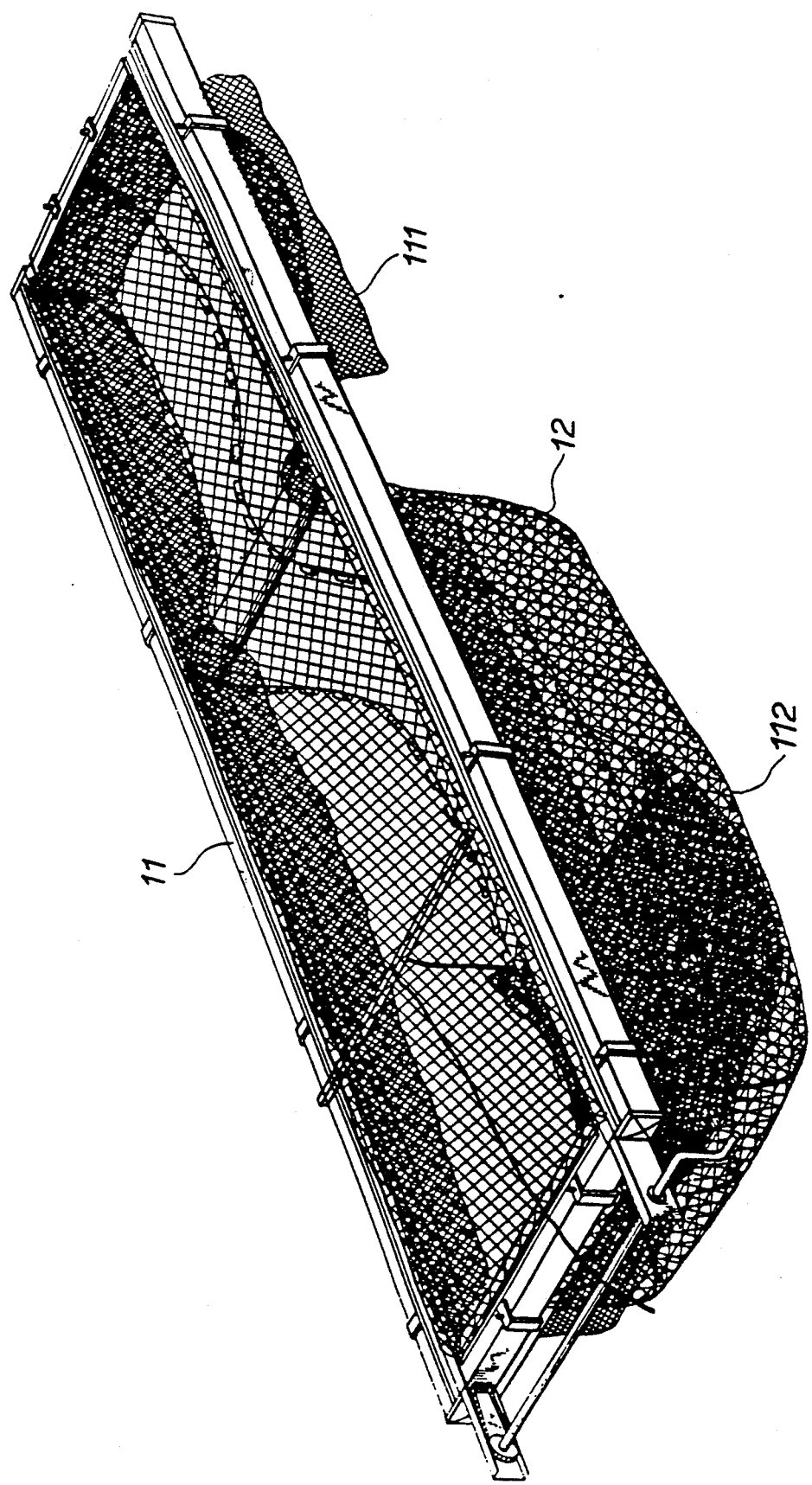

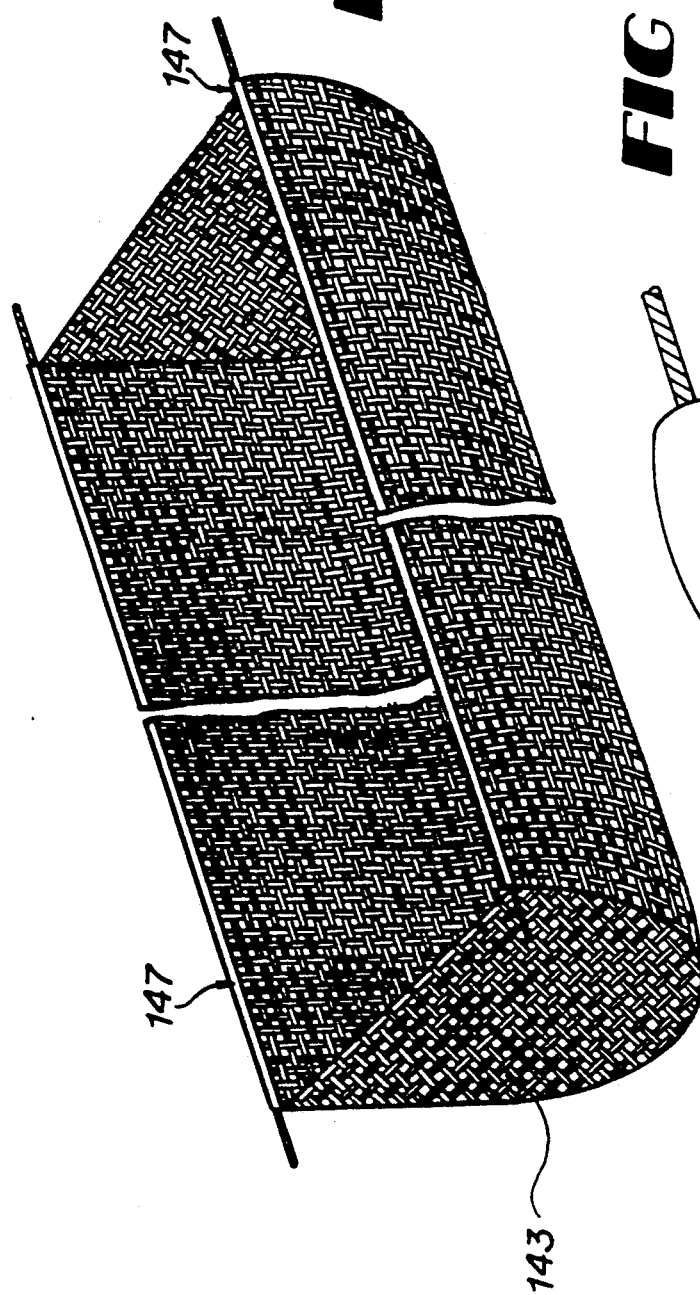
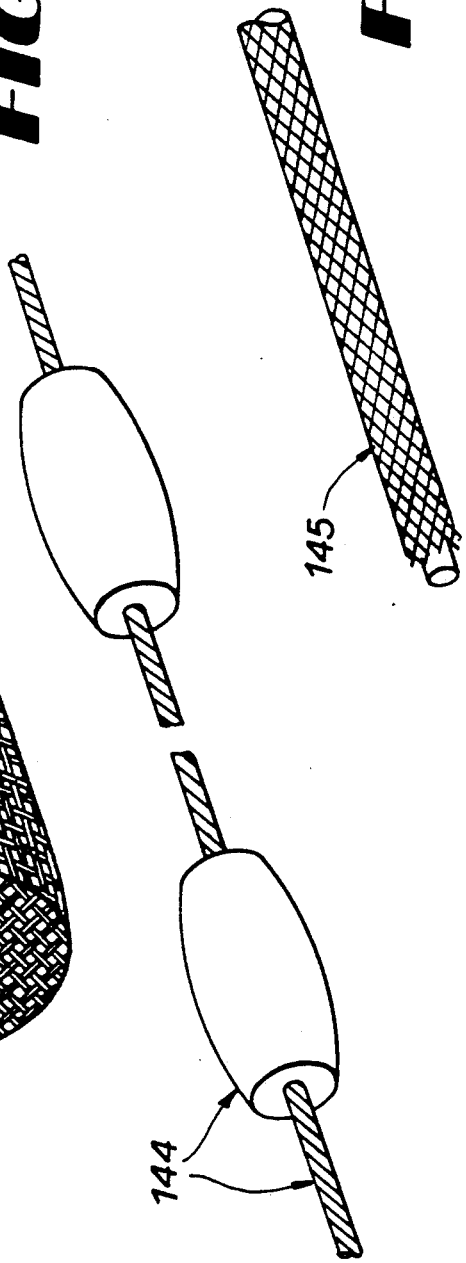
FIG 32
FIG 33
FIG 34

FISH RACEWAY APPARATUS AND METHOD

FIELD OF THE INVENTION

The present invention pertains to confining, feeding, and raising fish, or other aquatic animals and, more particularly, to an apparatus and method for efficiently harvesting and grading large quantities of fish or other aquatic animals.

BACKGROUND OF THE INVENTION

Various apparatuses have been employed in raising and harvesting large quantities of fish. One such apparatus is a fish growing tank. The fish growing tank typically comprises a large round tank, or perhaps a long rectangular tank, which contains a large volume of water for housing the fish and includes a water circulation system to maintain an oxygen supply in the water. To harvest or retrieve fish of a desired size from a fish growing tank, an operator scoops appropriate sized fish from the tank with a fish net. An advantage of using a fish growing tank to raise large quantities of fish is that it is easy to retrieve the fish from the tank. However, such tanks are expensive to clean and maintain and their control systems are subject to mechanical and power failures, which creates the potential for massive loss of fish.

A simple, less expensive, and less risky apparatus for raising and harvesting fish is a fish cage. The fish cage typically comprises a sturdy rectangular cage with mesh walls and a removable lid. The cages are stocked with fish and submerged in a pond, lake, or other similar water channel, connected by a rope typically tied to a dock. Within these cages, fish are allowed to grow while they are fed and raised for sale. An advantage of using fish cages to raise fish is that the cages are not vulnerable to power failures. However, retrieving the fish from these cages can be difficult.

More specifically, in order to allow for easy handling of the cages, their size is limited, which means that many cages are required to raise a substantial volume of fish. A typical cage size is four feet by four feet square. Harvesting fish from even one of these cages often requires a handful of laborers. As a result, the operations of a large scale fishery are rather labor intensive. In addition, the harvesting operation is quite time consuming, as nets are typically used to scoop the fish from the cages, and requires that the fish be removed from the water at least temporarily, which can injure or even kill the fish.

Feeding and treatment of fish within fish cages can create problems. Containing the feed within the cages for a sufficient period of time to ensure complete consumption by the fish can be difficult. For example, when using sinking feed, oftentimes, the fish will not consume all of the feed before the sinking feed "sinks" below the cage out of reach of the fish. In addition, treating the fish in these cages with a medical solution often requires that the entire pond or lake be treated, which can be expensive and wasteful.

Furthermore, with fish growing tanks and fish cages, there is no simple and efficient way to grade large quantities of fish. For example, in order to retrieve only large sized fish from a fish cage, one or more operators are required to raise the fish cage to the surface of the water, while an additional operator, armed with a fish dip net, scoops the larger fish from the cage, returning any small fish inadvertently retrieved back into the cage. Such a task is undesirably time consuming and labor intensive.

Accordingly, a heretofore unaddressed need exists for a simple apparatus and method for raising large quantities of fish wherein the fish can be fed and treated efficiently and from which the fish can be easily graded by size and harvested for sale. It is to such an apparatus and method that the present invention is directed.

SUMMARY OF THE INVENTION

Briefly described, the present invention is a fish raceway apparatus and method for raising large quantities of fish or other aquatic animals. The raceway apparatus generally comprises a floating rectangular frame with a flexible mesh cage suspended therefrom that is sufficiently large to contain a great number of fish or the like. The rectangular frame includes a harvesting roller bar movable along the length of the rectangular frame for drawing the flexible mesh cage to the surface of the water in order to corral and confine the fish at one end of the raceway apparatus so that they can be easily retrieved.

The raceway apparatus is designed to float at the surface of the water. The flexible mesh cage forms an enclosure submerged within a body of water, such as a lake or pond, and contains small weights in the bottom thereof for holding it submerged in a three dimensional generally rectangular shape. It is not necessary to secure the raceway apparatus to a dock, for the raceway apparatus can simply be tied up to the shore line. In this manner, the flexible mesh cage conforms to the contours of a lake bottom, for example, and, thus, provides for numerous installation locations throughout the body of water. In addition, the fish raceway apparatus, being adaptable for installation in a body of water, is essentially self-cleaning.

The harvesting roller bar is mounted slidably between the longitudinal sides of the raceway apparatus frame and is connected to a crank and cable arrangement for slidably moving the harvesting roller bar along the raceway apparatus. To harvest the fish, a single operator turns the crank to retract the harvesting roller bar along the raceway apparatus. The flexible mesh cage is designed to draw up over the moving harvesting roller bar, which essentially travels along the surface of the water, thereby preventing the fish from swimming over the bar. So arranged, the operator can gather the fish at one end of the raceway apparatus, thus making retrieval of the fish a simple task.

Retrieval of the fish can be accomplished by means of a conventional fish net. However, preferably, a fish auger, screw elevator, or other similar device, is utilized in conjunction with a water tank truck, for example. The fish auger can be inserted from above into one end of the raceway apparatus and rotated, thereby drawing the fish through the auger and into the water tank truck.

The raceway apparatus also includes a feed skirt, one foot to two feet in width, that is suspended from the raceway apparatus frame around its perimeter. The feed skirt is made of a dense mesh material and functions to contain floating fish feed within the flexible mesh cage. In addition, a densely woven feed bottom material is suspended from the raceway apparatus frame along the bottom of the flexible mesh cage to contain sinking fish feed within the flexible mesh cage.

The raceway apparatus also includes a flexible treatment tarp that is easily positioned around the exterior of the flexible mesh cage. The treatment tarp is made of a solid mesh material for containing, within the flexible mesh cage, treatment solutions used for medically treating the fish.

For grading fish by size, an alternative embodiment of the raceway apparatus is provided with a fish grader cage that can be mounted to one end of the raceway apparatus. The fish grading cage is a second frame-and-cage raceway apparatus, shorter in length than the main raceway apparatus. A fish grading divider gate is positioned between the two cages. The divider gate has adjustable openings sized to allow fish of a desired size to swim through while containing larger fish.

With this arrangement, either large or small size fish can be harvested from the raceway apparatus. For example, to retrieve large fish from the raceway apparatus, an operator opens up the grading divider gate and turns the crank to draw the harvesting roller bar toward the grading divider gate, thereby causing all the fish to be drawn into the fish grader cage. The operator then closes up the divider gate so that the openings in the divider gate are sufficiently small to allow only smaller fish to swim through. The operator then extends the harvesting roller bar to reform the netting cage of the main raceway apparatus. As the fish within the grader cage concentrate at the divider gate, most of the small fish will swim through the openings of the divider gate back into the main raceway apparatus, while the large fish are contained by the grading divider gate in the grader cage. From the grading cage, the large fish can be retrieved, either by fish nets or, preferably, by the auger device. To retrieve the remaining smaller fish from the raceway apparatus, the divider gate can be reopened and the harvesting roller bar retracted to draw the remaining smaller fish into the grading cage where they can be retrieved.

Accordingly, it is an object of the present invention to provide an apparatus and method for raising large quantities of fish wherein the fish can be easily harvested.

Another object of the present invention is to provide an apparatus and method for raising and harvesting fish that is operable by a single operator.

Another object of the present invention is to provide an apparatus for raising and harvesting fish that is employable at various locations throughout a body of water, such as a lake or pond.

Another object of the present invention is to provide an apparatus and method for raising large quantities of fish wherein an operator can feed, treat, harvest, and grade the fish at the surface of a body of water.

Another object of the present invention is to provide an apparatus and method for raising fish that provides a means for efficiently feeding and treating the fish.

Another object of the present invention is to provide an apparatus and method for raising fish that is simple in design, inexpensive to manufacture, and which reliably functions to raise, harvest, and grade the fish.

Another object of the present invention is to provide an apparatus for raising and harvesting fish that due to its simple design can be manually operated within a natural body of water and, thus, is not subject to mechanical or power failures.

Another object of the present invention is to provide an apparatus and method for harvesting marketable sized fish of uniform size.

Another object of the present invention is to provide an apparatus and method for raising and harvesting many varieties of fish with less labor and time consumption than methods and devices of the prior art.

Other objects, features, and advantages of the present invention will become apparent from the following description when read in conjunction with the accompanying drawings.

BRIEF DESCRIPTION OF THE DRAWINGS

The present invention can be better understood with reference to the following drawings. The views illustrated in the drawings are not necessarily to scale, emphasis instead being placed on clearly illustrating principles of the present invention.

FIG. 7 is an enlarged detail view of a chain used to drive the harvesting roller;

FIG. 8 is an enlarged perspective view of a timing sprocket for a harvesting mechanism of FIG. 1;

FIG. 9 is a perspective view of a harvesting mechanism of the fish raceway apparatus of FIG. 1;

FIG. 10 is a partial perspective view of a flexible mesh cage for the fish raceway apparatus of FIG. 1;

FIG. 11 is a perspective view of the flexible mesh cage shown with an arrangement of weights at the bottom thereof;

FIG. 12 is a cross-sectional view of the flexible mesh cage of FIG. 11;

FIGS. 13-16 are partial perspective views of border arrangements for the flexible mesh cage shown in FIG. 1;

FIG. 24 is a perspective view of the fish raceway apparatus of FIG. 1;

FIG. 25 is a perspective view of the fish raceway apparatus of FIG. 1 shown with the flexible mesh cage netting removed to illustrate the specialty nettings of the fish raceway apparatus;

FIG. 26 is a perspective view of the fish raceway apparatus of FIG. 1 shown with all the netting attached to the frame of the fish raceway apparatus;

FIG. 32 is a perspective view of a treatment tarp or chamber used to surround the flexible mesh cage netting of FIG. 1 for treating the fish with medical solutions;

FIG. 33 is an enlarged view of a floating rope used to support the treatment tarp of FIG. 32;

FIG. 34 is an alternative embodiment for the floating rope shown in FIG. 33;

DETAILED DESCRIPTION OF THE PREFERRED EMBODIMENT

Figure 1:
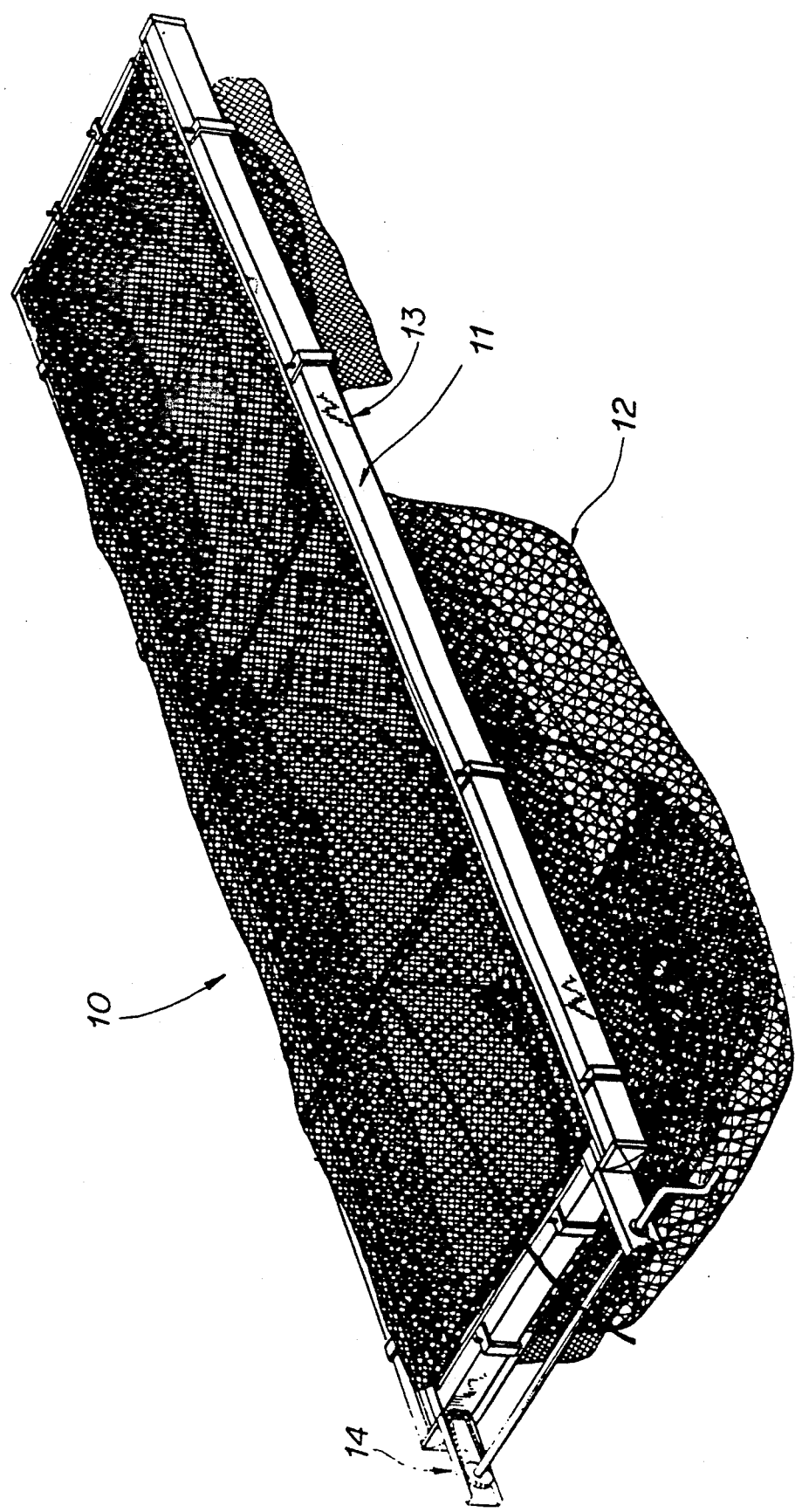
FIG. 1 is a perspective view of a fish raceway apparatus in accordance with a preferred embodiment of the present invention.

Referring now in more detail to the drawings, in which like numerals represent like parts throughout the several views, FIG. 1 illustrates a fish raceway apparatus 10 that embodies principles of the present invention constructed in accordance with a preferred embodiment thereof. The fish raceway apparatus 10 comprises generally an elongated, tubular, rectangular frame 11, a flexible mesh cage or netting 12, and a harvesting means 14 for drawing the cage netting 12 toward the rectangular frame 11, as shown at 13, in order to draw the fish toward one end of the fish raceway apparatus 10 so that they can be readily retrieved therefrom.

Figure 2:
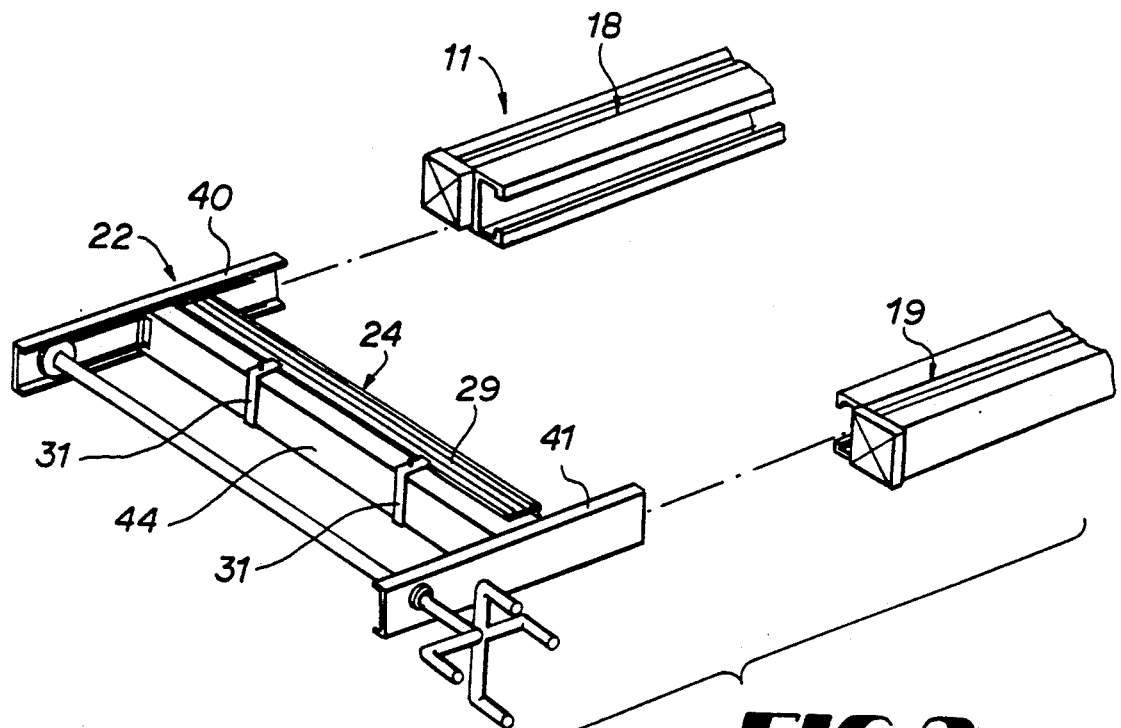
FIG. 2 is a partial perspective view of a harvesting end of the fish raceway apparatus of FIG. 1.
Figure 3:
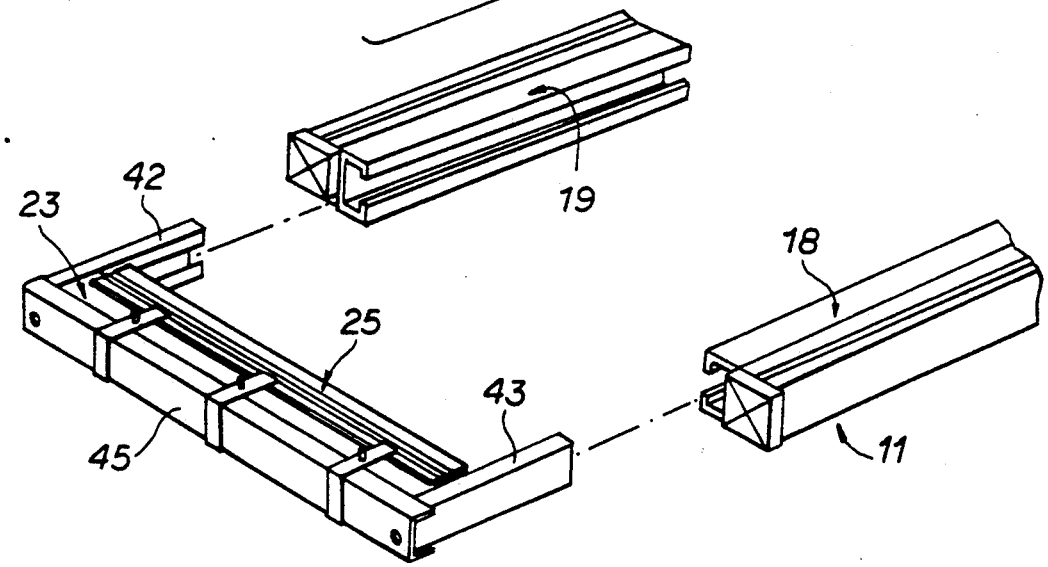
FIG. 3 is a partial perspective view of a remote end of the fish raceway apparatus of FIG. 1.

As shown in FIGS. 2 and 3, the construction of the elongated, rectangular raceway apparatus frame 11 comprises generally two elongated tubular side beams 18 and 19, a harvesting end assembly 22, and a remote end assembly 23. The harvesting end assembly 22 and the remote end assembly 23 are adapted to mount between the side beams 18 and 19 at the ends thereof to form the elongated rectangular raceway apparatus frame 11. The mounting of the flexible mesh cage netting 12 to the rectangular raceway apparatus frame 11 will be discussed later. The harvesting end assembly 22 is positioned at the end of the raceway apparatus 10 in which the harvesting means 14 is adapted to gather the fish for retrieval from the raceway apparatus and shall be referred to as the harvesting section of the raceway apparatus. The harvesting end assembly 22 comprises a shortened tubular end beam 24 and the remote end assembly 23 comprises a shortened tubular end beam 25, both constructed similarly to side beams 18,19.

Figure 4:
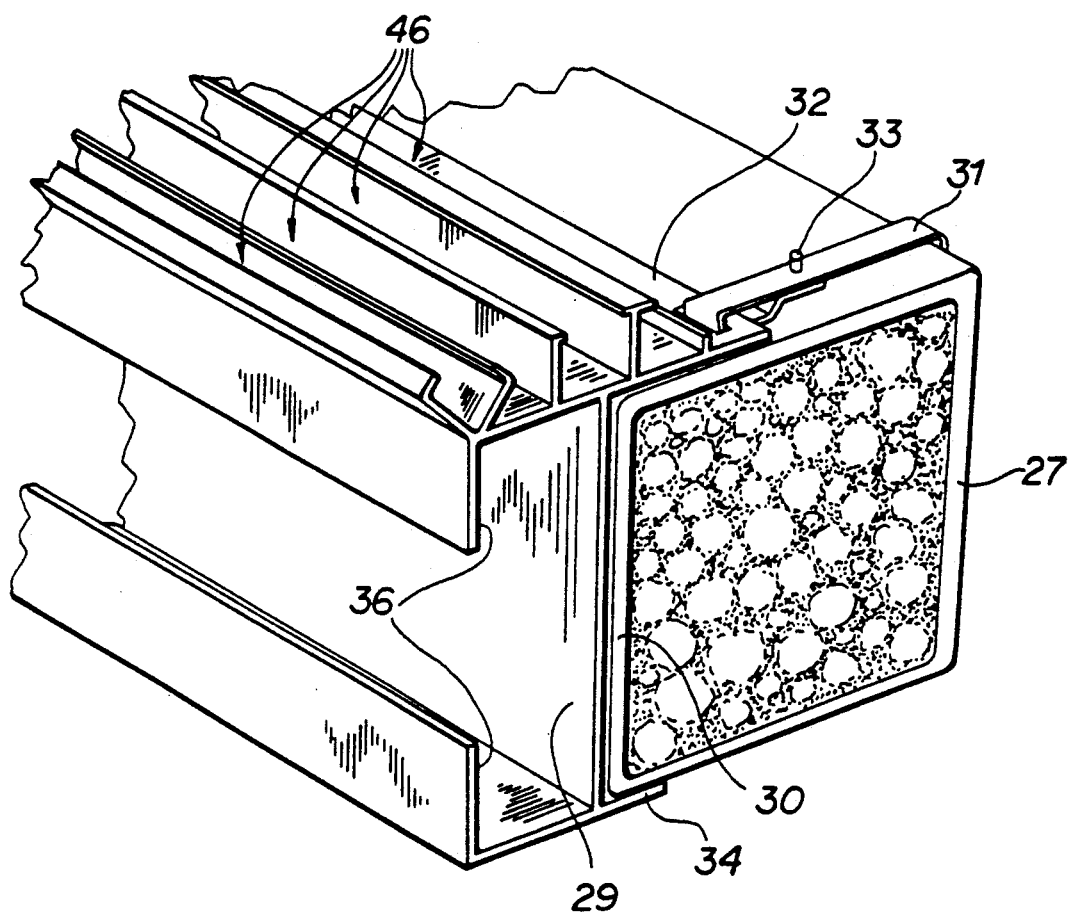
FIG. 4 is an enlarged partial perspective view in cross-section of a frame for the fish raceway apparatus of FIG. 1.

FIG. 4 is a cross-sectional view of the structure of either the side beams 18,19 or of the end beams 24,25 of the harvesting end assembly 22 or the remote end assembly 23, respectively. The structure comprises a square tubular beam 27 made of water impervious material, for example polyvinylchloride (PVC). A styrofoam material 28, or other conventional type of material suitable for flotation purposes, is enclosed within the square tubular beam 27. The purpose of the styrofoam material 28 is to cause the raceway apparatus frame 11 and the entire fish raceway apparatus 10 to float at the surface of a body of water. A multi-configured mounting bracket 29 is provided along the inward side 30 of the tubular beam 27 and is secured thereto by a conventional stainless steel worm gear hose clamp 31. The hose clamp 31 loops through the mounting bracket 29 along the top edge 32 of the mounting bracket 29 and is riveted to itself by rivet 33. A similar loop and rivet arrangement is used to secure the other end of the hose clamp 31 around the outward side of the tubular PVC beam 27 to the bottom edge 34 of the mounting bracket 29.

The mounting bracket 29 includes a C-shaped roller bar guide channel 36 that runs along the inward side 30 of the tubular PVC beam 27. Referring to FIGS. 2, 3 and 4, the C-shaped guide channel 36 is adapted to receive corresponding C-shaped side brackets 40, 41, of the harvesting end assembly 22 and side brackets 42,43 of the remote end assembly 23. The C-shaped guide channels 36 can be secured to the side brackets 40-43 by any suitable means, such as by welding. A transverse support bracket 44 rigidly secures side brackets 40,41 of the harvesting end assembly 22 in parallel relationship. The transverse support bracket 44 is secured to end beam 24 by the stainless steel hose clamps 31 that secure the mounting bracket 29 to the tubular PVC beam 27. Likewise, a transverse support bracket 45 is provided to secure side brackets 42,43 of the remote end assembly 23 together in parallel relationship.

Referring to FIG. 4, the mounting bracket 29 also includes a series of slots or grooves 46. The grooves 46 are used to secure the flexible mesh cage netting 12, as well as other specialty nets, to the rectangular frame 11, as discussed hereinafter.

Figure 6:
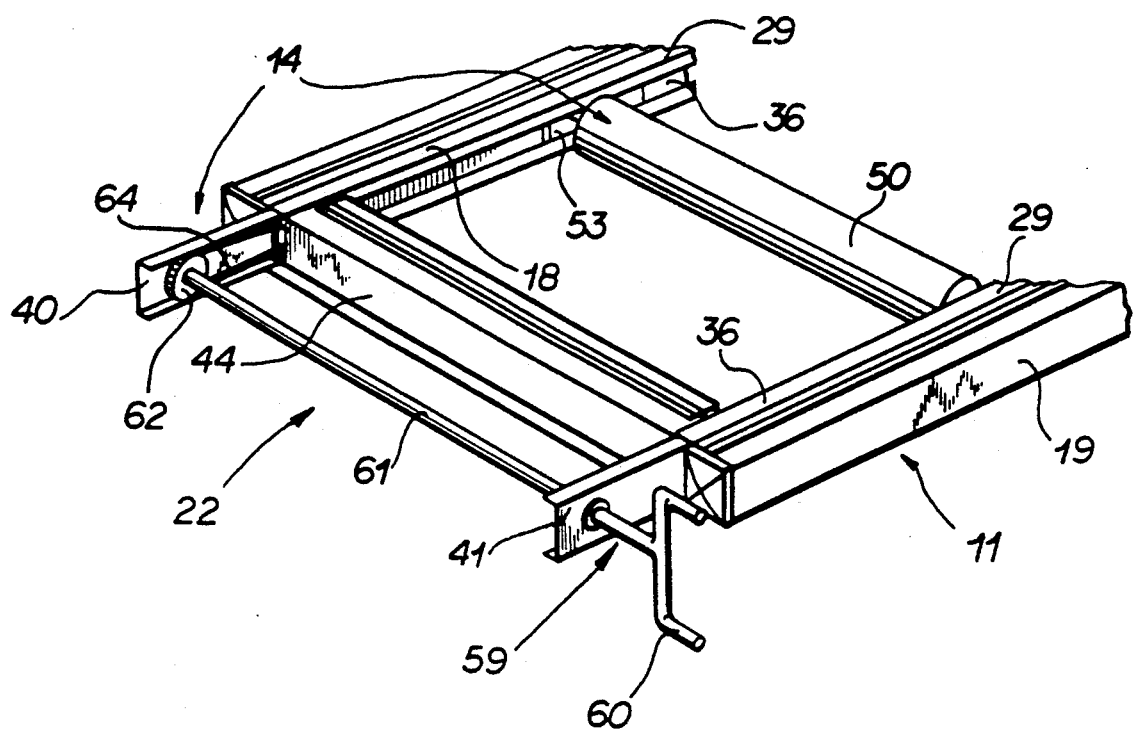
FIG. 6 is a partial perspective view of the harvesting section of the fish raceway apparatus of FIG. 1 shown with the harvesting roller.
Figure 5:
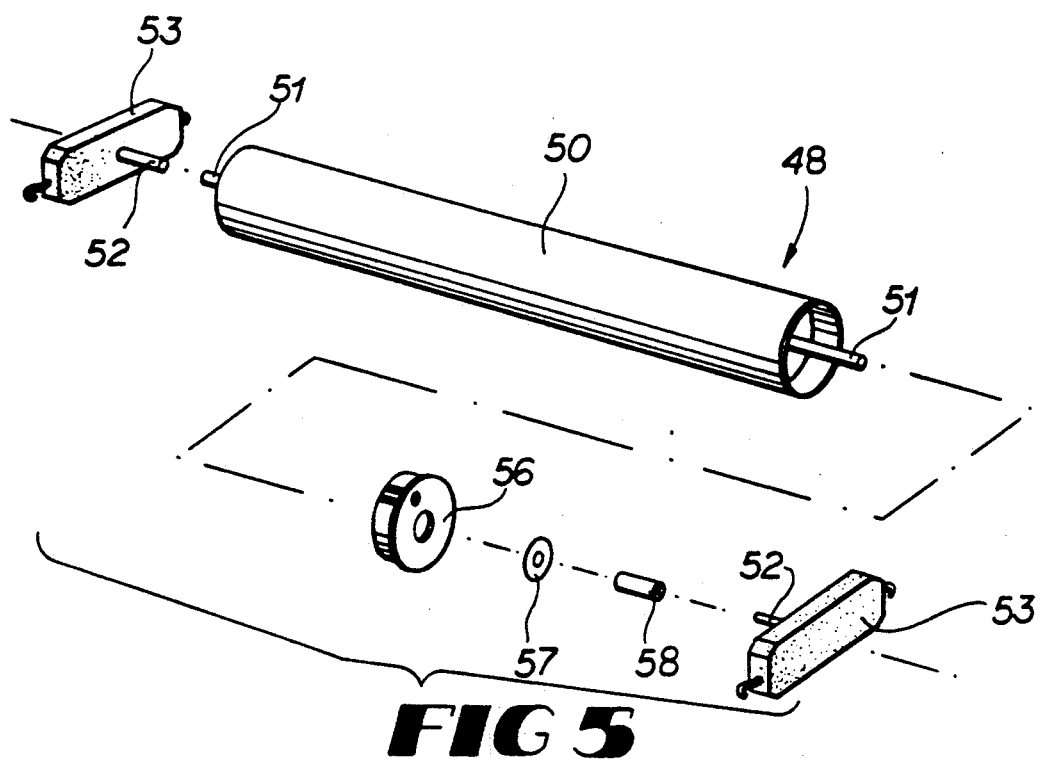
FIG. 5 is an exploded view of a harvesting roller of the fish raceway apparatus of FIG. 1.
Figure 19:
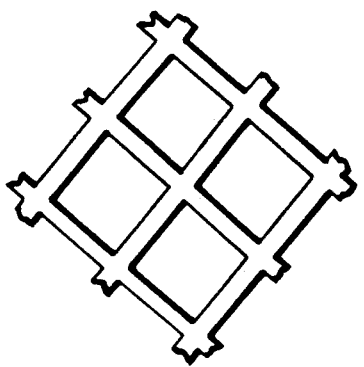
FIGS. 17-23 are enlarged views of the flexible mesh cage netting material used for the various nettings of the fish raceway apparatus of FIG. 1.
Figure 20:
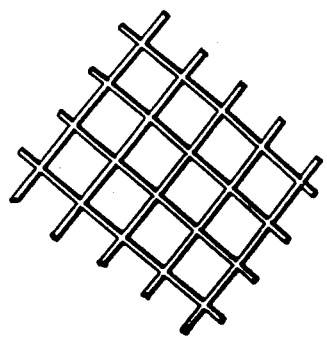
Figure 18:
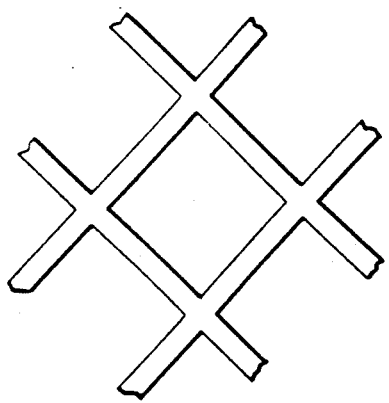
Figure 21:
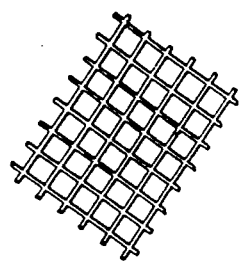

FIGS. 5 and 6 detail the harvesting means 14 of the fish raceway apparatus 10. Referring to FIG. 5, the harvesting means comprises a roller bar assembly 48, which includes an elongated cylindrical roller bar 50 rotatably mounted on a hollow axial shaft 51. A pair of threaded stub shafts 52 threadably receive and support the axial shaft 51 of the elongated cylindrical roller bar 50 between a pair of rectangular travel blocks 53 that are sized to move slidably within the C-shaped guide channels 36 of the mounting brackets 29 of each side beam 18, 19. The travel blocks 53 are preferably made from a wear resistant plastic material. A respective cap piece 56 (only one shown) seals off each end of the cylindrical roller bar 50. A washer 57 and a spacer 58 are provided to center the roller bar 50 between the travel blocks 53.

Referring now to FIG. 6, the cylindrical roller bar 50 is shown slidably mounted between the side beams 18, 19 of the raceway apparatus frame 11 with the rectangular travel blocks 53 (only one shown) positioned within the C-shaped guide channels 36 of the mounting brackets 29. The harvesting means 14 also includes a crank assembly 59 comprising a crank arm 60 attached to a crank arm shaft 61 rotatably mounted between the side brackets 40 and 41 of the harvesting end assembly 22. A pair of timing sprockets 62 (only one shown) are mounted to the crank arm shaft 61 within the side brackets 40 and 41. A drive belt or chain 64 is connected to each rectangular travel block 53 and is driven by the rotation of the crank arm 60 and timing sprockets 62, as discussed in more detail with reference to FIG. 9.

FIG. 7 is an enlarged detail view of the drive belt or chain 64 used to move the rectangular travel blocks 53.

The drive belt 64 comprises a multiplicity of interconnected tabs 66. Each tab 66 includes a headed end 67 and two openings 68. The headed end 67 of each tab 66 is inserted through aligned openings 68 of the two preceding interconnected adjacent tabs and the openings 68 of each tab receive the headed end of the two subsequent interconnected tabs. A Power Twist ® V-belt drive chain manufactured by Fenner Manheim, Manheim, Pa., U.S.A. has been found to work satisfactorily in operation. However, it should be understood that other types of belts or cables known in the art are suitable for the operation of the harvesting means 14.

FIG. 8 is an enlarged detailed view of one of the timing sprockets 62. The timing sprocket 62 comprises a wheel 71 having an annular groove 72 and a series of equally spaced bolts 73 secured between the side walls that form the annular groove 72. The drive chain or timing belt 64 is adapted to move around the timing sprocket 62 within the annular groove 72 with the headed ends 67 of the tabs 66 adapted to catch the bolts 73 and be driven thereby so that the sprockets 62 drive the timing belts 64 and, on turn, the travel blocks 53 along each side beam 18, 19 in timed relationship.

FIG. 9 illustrates the assembly of the harvesting means 14. The crank assembly 59 is positioned at the harvesting end of the raceway apparatus frame 11, and the roller bar 50 is adapted to move between the side beams 18, 19 along the length of the raceway apparatus. At the remote end of the raceway apparatus frame 11 are a pair of idler pulleys 75 held within brackets 76 that are secured to a pair of threaded bars 78, which are adjustably secured to the remote end assembly 23. The threaded bars 78 can be adjusted by rotation to tension the timing belt 64. Rotation of crank arm 60 rotates the timing sprockets 62 and drives the timing belt 64. The upper run 81 of each timing belt 64 moves over the top of the rectangular travel blocks 53, and the lower run 82 of each timing belt 64 is secured at each end thereof to the rectangular travel blocks 53 at each end thereof by hooks 83.

FIG. 10 is a partial detail view of the flexible mesh cage netting 12. The netting material can be made of any material of sufficient strength and flexibility that is suitable for underwater application, such as polypropylene netting. The flexible mesh cage netting 12 is constructed of two pieces 84 and 85 of polypropylene netting connected along a bottom seam 86. A border material 87 can be secured along the upper edges of the polypropylene netting 12 for appearance purposes. The construction of the seam 86 and border material 87 shall be discussed hereinafter. FIG. 11 illustrates the general shape that the flexible mesh cage netting 12 assumes when it is suspended from the raceway apparatus frame 11 within a body of water. The cage netting 12 forms an elongated rectangular enclosure that is open at the top and has flexible mesh netting enclosing the ends of the cage netting 12.

An arrangement of weights 88 are secured along the bottom of the cage netting 12 to maintain the rectangular shape of the flexible mesh cage netting 12. Each weight 88 is cylindrical in shape and has a longitudinal bore hole therethrough for receiving a connecting rope 89 that runs along the length of the cage netting 12 and is secured thereto between adjacent weights 88 by simple plastic ties 91. Three rows of connecting ropes and weights 93, 94 and 95, as depicted in FIG. 12, are provided, with row 94 aligned down the center of the cage netting 12 and rows 93 and 95 aligned along the outer edges of the cage netting 12. Accordingly, upon suspension of the cage netting 12 from the elongated rectangular raceway apparatus frame 11 within a body of water, the cage netting 12 forms an elongated rectangular enclosure adapted to contain therein a quantity of fish, or other water creatures.

FIG. 13 illustrates the design of the optional top peripheral border material 87 of the cage netting 12. The border material 87 can be made of woven plastic material, for example, and is secured around the top peripheral edge 98 of the cage netting 12 by stitching 99. FIGS. 14 through 16 illustrate alternative constructions for the seam 86, which joins the two polypropylene nettings 84 and 85 along the bottom of the cage netting. In FIG. 14, a single liner material 101, which can also be made of woven plastic, is provided for securing the polypropylene netting 84 and 85 together by stitching 102. In FIG. 15, the construction of the seam 86 comprises a border material 87 provided for each netting 84, 85 and a larger enclosing liner material 103 provided to secure the two border materials together, again with a conventional stitching pattern 104. In FIG. 16, two individual border materials 105 and 106 are secured together by stitching 107 without the use of an enclosing liner, as illustrated in FIG. 15.

Figure 23:
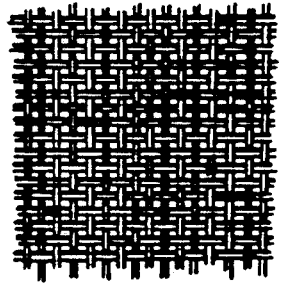
Figure 17:
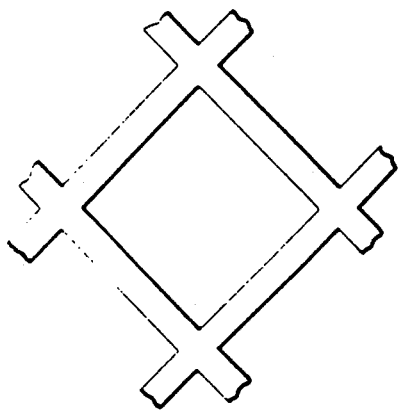
Figure 22:
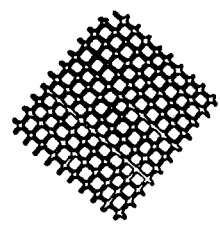

FIGS. 17 through 23 illustrate various grades of netting for the different nettings utilized with the fish raceway apparatus. Depending upon the type of fish to be raised in the fish raceway apparatus, the flexible mesh cage netting 12 can be constructed with either of the grades depicted in FIGS. 17 through 22. FIG. 17 is one-inch netting, FIG. 18 three-quarters inch, FIG. 19 one-half inch, FIG. 20 one-quarter inch, FIG. 21 one-eighth inch, and FIG. 22 is one-sixteenth inch netting. Other grades can be used as well. FIG. 23 illustrates a substantially solid woven fabric material utilized for certain feeding and treating applications, discussed hereinafter.

FIG. 24 illustrates the arrangement of the flexible mesh cage netting 12 suspended from the rectangular frame 11 of the fish raceway apparatus 10. The flexible mesh cage netting 12 is adapted to move above the roller bar 50 as the roller bar moves along the side beams 18 and 19 within the C-shaped guide channels thereof. As previously stated, the fish raceway apparatus 10 is adapted to float in a body of water, such as a lake, with the cage netting 12 forming a substantially rectangular enclosure within the water below the rectangular frame 11. The roller bar 50 is adapted to move along the side beams 18 and 19 at approximately the surface of the water, thus progressively lifting, collapsing, closing or drawing successive increments of the bottom of the cage netting 12 to the surface of the water for progressively reducing the cross section of the cage 12 and thus reduce the effective volume of the cage netting 12 in which the fish are located. With the fish raceway apparatus installed within a body of water and a quantity of fish placed in the enclosure formed by the cage netting 12, the fish can be herded or driven into the harvesting section 108 of the fish raceway apparatus 10 by moving the roller bar 50 progressively from the remote end 109 of the fish raceway apparatus to the harvesting end, thereby collapsing or drawing the cage netting 12 for reducing the effective volume of the fish enclosure area together toward the harvesting section 108. From the harvesting section 108, the fish which are now confined in or crowded into section 108 can be retrieved from the fish raceway apparatus 10 by either conventional means or by use of a fish auger, as discussed hereinafter.

FIG. 25 illustrates two different optional specialty netting arrangements for use with the fish raceway apparatus 10 of the present invention. First, a feed skirt 111 can be provided around the raceway apparatus frame 11. The feed skirt 111 is suspended from the mounting bracket 29 in a manner discussed hereinafter. The feed skirt 111 hangs down into the enclosure formed by the flexible mesh cage 12 and is used to contain floating fish feed within the fish raceway apparatus 11. Floating fish feed is simply fish feed that floats at the surface of the water rather than sinking down into the water. When the roller bar 50 is moved along the length of the raceway apparatus, the feed skirt 111 moves above the roller bar 50 in the same manner as does the flexible mesh cage netting 12. Second, a square tarp-like feed bottom 112 is suspended from the bottom of the mounting bracket 29 by four cables 113. The feed skirt 111 and the feed bottom 112 are made from the netting material illustrated in FIG. 23. The feed bottom 112 includes a series of weights 114 located at the four corners thereof and at the center area of the feed bottom 112 to weight the feed bottom 112 at the bottom of the cage netting 12. The feed bottom 112 is used to catch any sinking feed used to feed the fish. Sinking feed is simply fish feed that sinks through the water rather than floating on the top, as does floating feed. A center lift cable 116 is attached to the center of the feed bottom 112 and is draped over a horizontal elongated support rod 118 that is mounted between the side beams 18 and 19 of the rectangular frame 11. The center lift cable 116 is used to dislodge any left over, uneaten sinking feed from the surface of the feed bottom 112.

Figure 27:
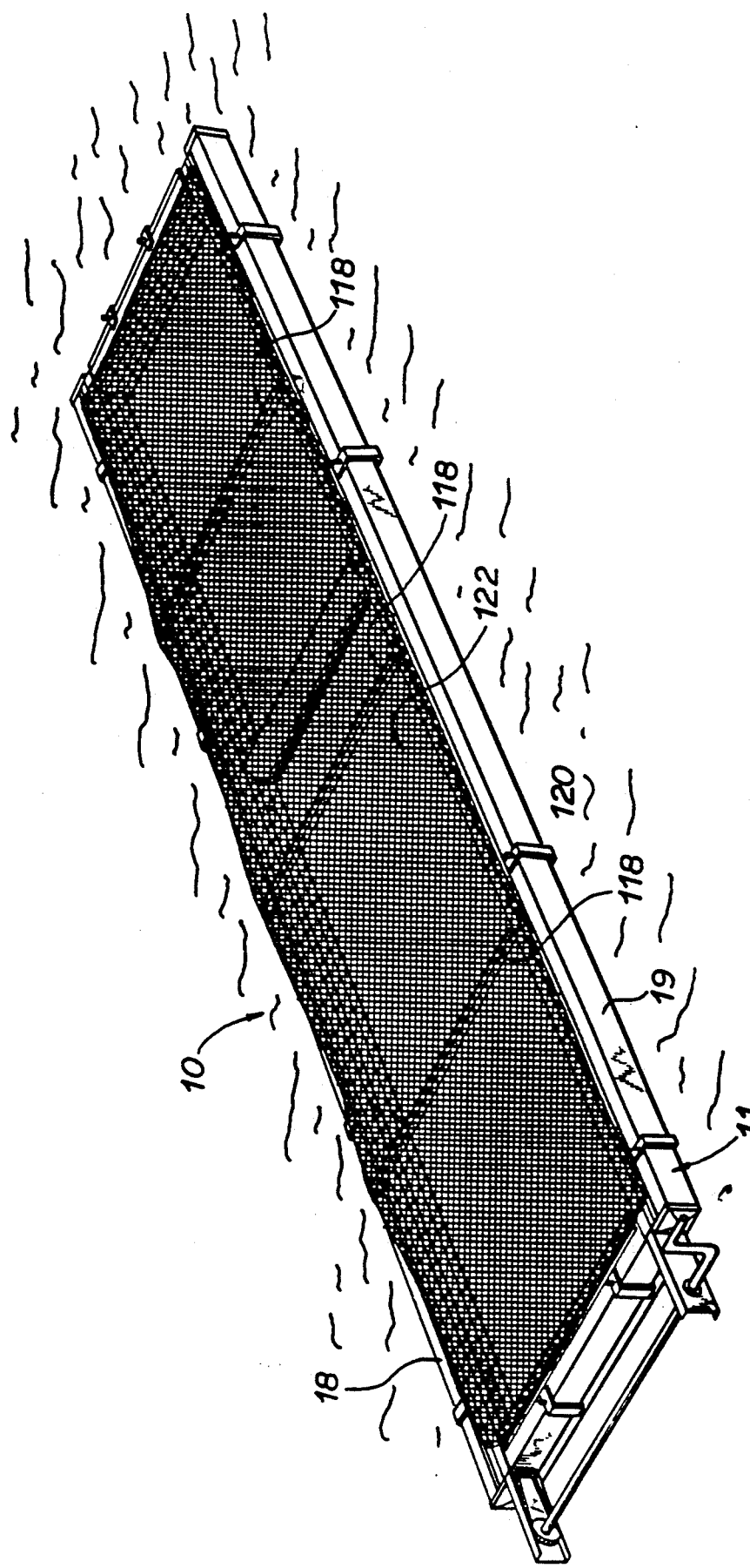
FIG. 27 is a perspective view of the fish raceway apparatus of FIG. 1 shown installed in a body of water.

FIG. 26 illustrates the assembly of the feed skirt 111, the feed bottom 112, and with the flexible mesh cage netting 12 all suspended from the raceway apparatus frame 11. FIG. 27 illustrates the fish raceway apparatus 10 floating in a body of water 120. An elongated rectangular top cover net 122 is provided over the enclosure formed by the flexible mesh cage netting 12. The top cover net 122 can be made of any of the netting material illustrated in FIGS. 17-22. Additional support rods 118 are mounted between the side beams 18 and 19 of the raceway apparatus frame 11 to support the top cover net 122.

Figure 28:
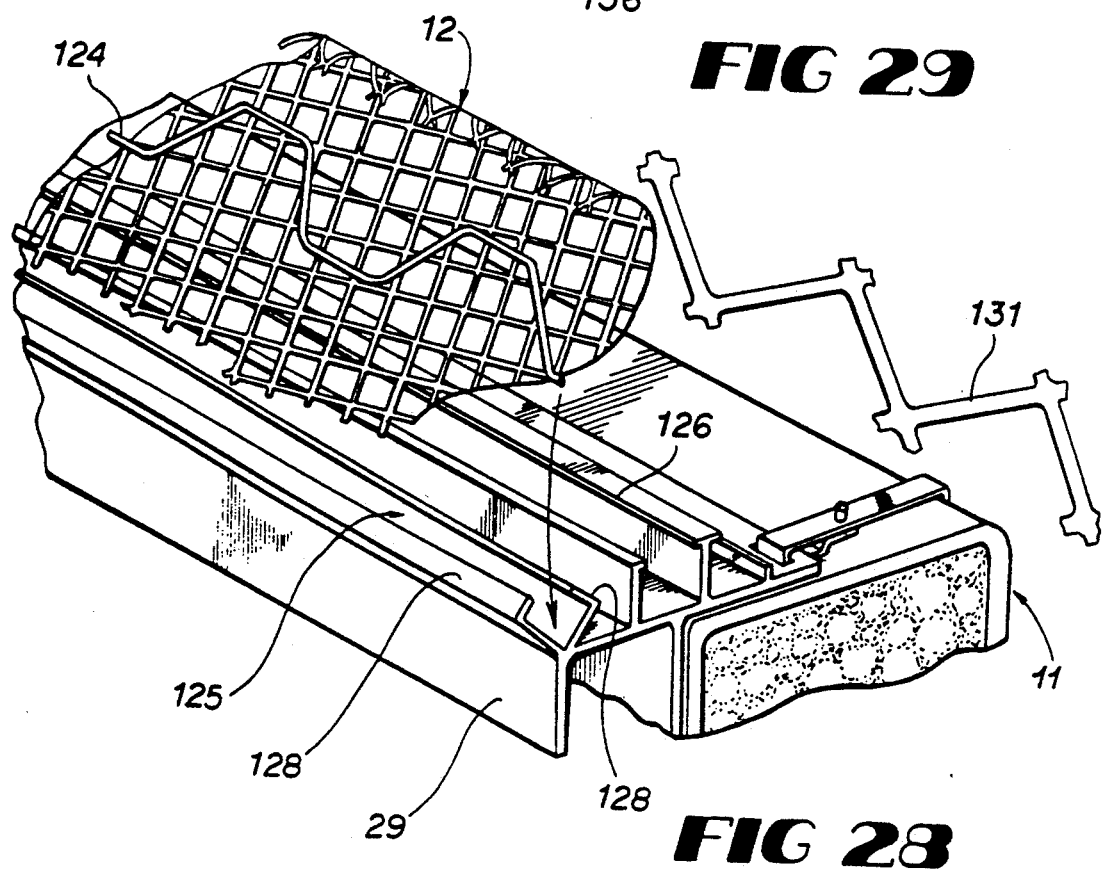
FIG. 28 is a partial perspective view of the frame for the fish raceway apparatus showing an alternative method for attaching the flexible mesh cage netting to the frame.

FIG. 28 depicts the mounting arrangement of the flexible mesh cage netting 12 to the mounting bracket 29 of the raceway apparatus frame 11. The cage netting 12, shown in FIG. 28, is an unbordered piece of cage netting as opposed to the bordered embodiment illustrated in FIG. 13. A polygonal wave-shaped locking piece 124 is used to secure the cage netting 12 within a V-shaped groove 125, as depicted by arrow 126. To secure the cage netting 12 within the V-shaped groove 125, the cage netting 12 is laid over the V-shaped groove 125 and the locking piece 124 is inserted down into the V-shaped groove, until the locking piece is secured within the top flanges 128 of the V-shaped groove 125. An alternative locking piece is illustrated in FIG. 28 that comprises a zig-zag locking piece 131 that can be cut from the flexible mesh cage material depicted in FIGS. 17 or 18. For this, the locking piece 131 should be made of a stiffer material such as solid plastic or metal, rather than a more flexible material such as polypropylene netting.

Figure 29:
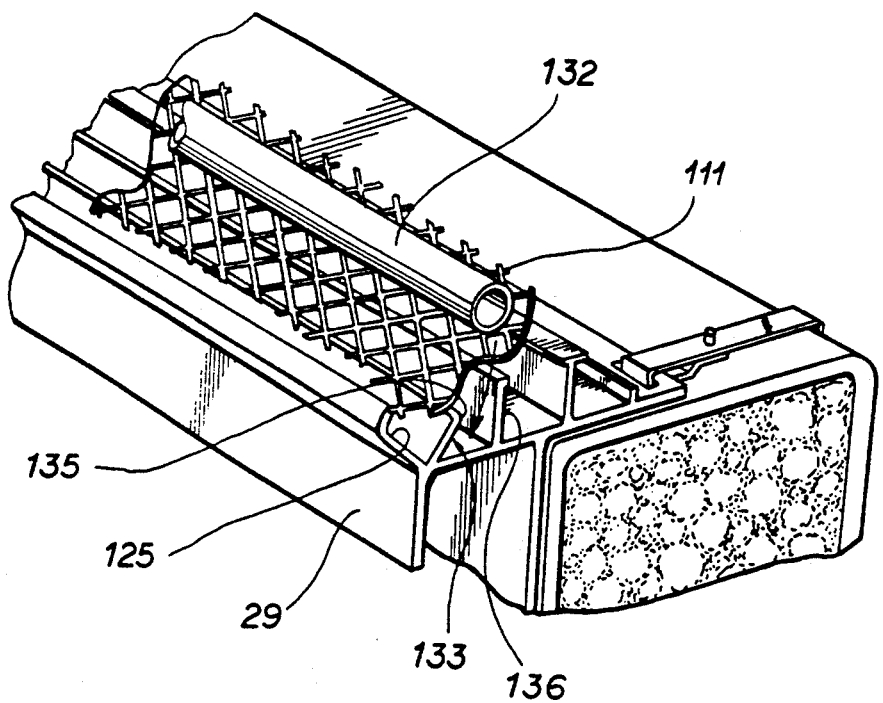
FIG. 29 is a partial perspective view of the frame for the fish raceway apparatus illustrating a mounting bracket used to attach the flexible mesh cage netting to the frame.
Figure 30:
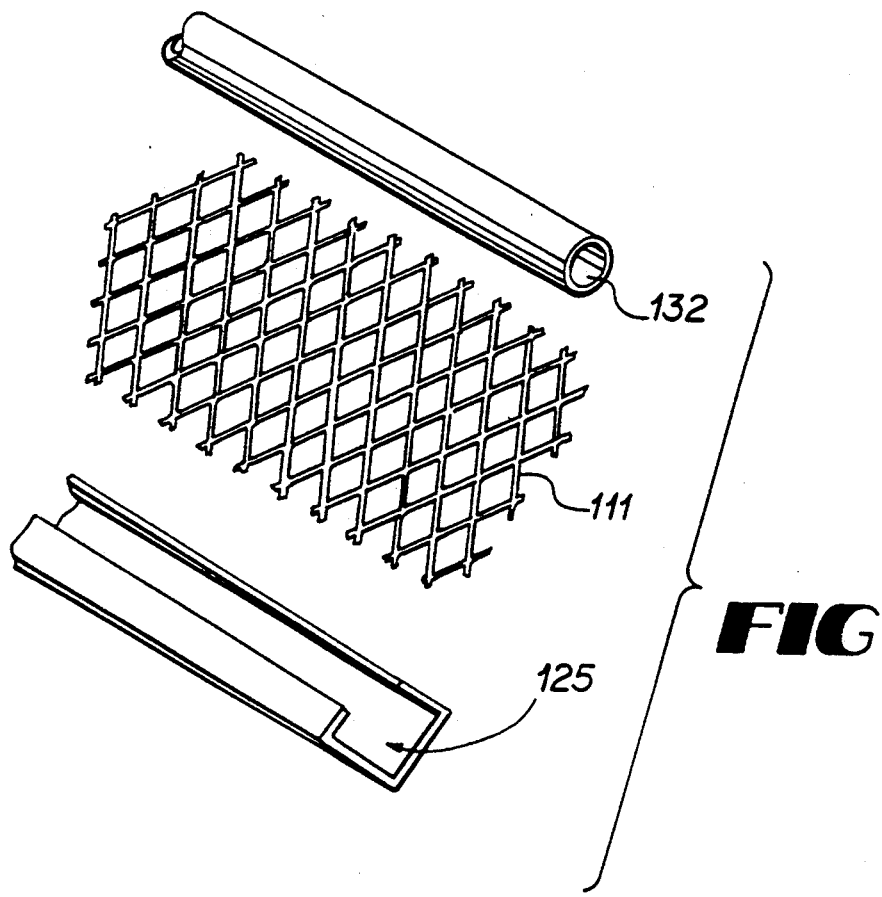
FIG. 30 is an exploded view of the mounting arrangement for the flexible mesh cage netting.

FIG. 29 illustrates the mounting arrangement for the feed skirt material 111 into the mounting bracket 29. A semi-rigid elongated hallow lock tube 132 is provided for securing the feed skirt material 111 within a groove 133 that is adjacent to the V-shaped groove 125 used to secure the cage netting 12. The diameter of the locking tube 132 is slightly greater than the width of the groove 133 at its minimal width between the top edge 135 of the V-shaped groove 125 and the vertical rail 136 spaced therefrom. Thus, lock tube 132 snap-fits into groove 133 and secures the feed skirt material 111 therein. FIG. 30 illustrates an alternative mounting arrangement for groove 125 using lock tube 132 and netting 111.

Figure 31:
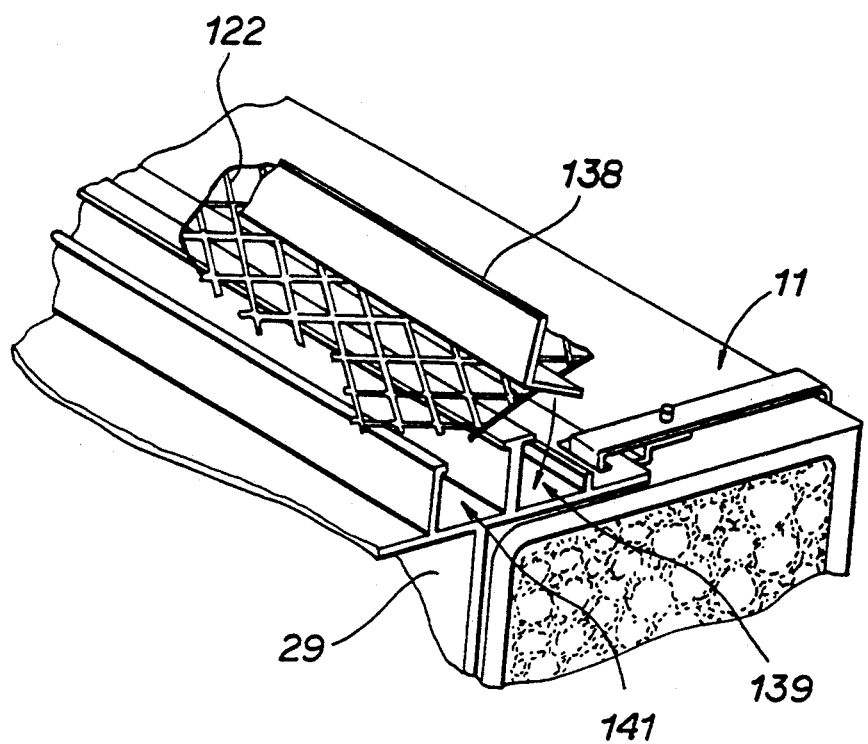
FIG. 31 is a partial perspective view of the mounting arrangement for the feed skirt of the fish raceway apparatus shown in FIG. 1.

FIG. 31 illustrates the mounting arrangement for the top cover net 122. An angle bracket 138 is provided that fits within an L-shaped groove 139. The L-shaped groove 139 is sized to receive snugly the angle bracket 138 therein. Again, the top cover net 122 is laid over the L-shaped groove 139 and the angle bracket 138 is pressed into the L-shaped groove 139 to secure the top cover net 122 to the mounting bracket 29 of the raceway apparatus frame 11. The U-shaped groove 141 shown in FIG. 31 is used to secure the ends of the top horizontal support rods 118 to the mounting bracket 29.

FIGS. 32, 33 and 34 illustrate a treatment tarp arrangement used for treating the fish with medical solutions. The arrangement comprises a medical treatment tarp 143 that is sized to fit around the exterior of the flexible mesh cage netting 12. A buoy and cable arrangement 144, as illustrated in FIG. 33, or a floating rope arrangement 145, as illustrated in FIG. 34, are provided along the longitudinal upper edges 147 of the medical treatment tarp 143. The buoy and cable arrangement 144 or the floating rope arrangement 145 cause the treatment tarp 143 to float around the exterior of the flexible mesh cage netting 12. The treatment tarp material is made of a substantially water impervious material, such as the netting illustrated in FIG. 23, so that medical solutions introduced into the water within the flexible mesh cage netting 12 are contained therein and, thus, do not disburse outwardly into the rest of the body of water.

Figure 35:
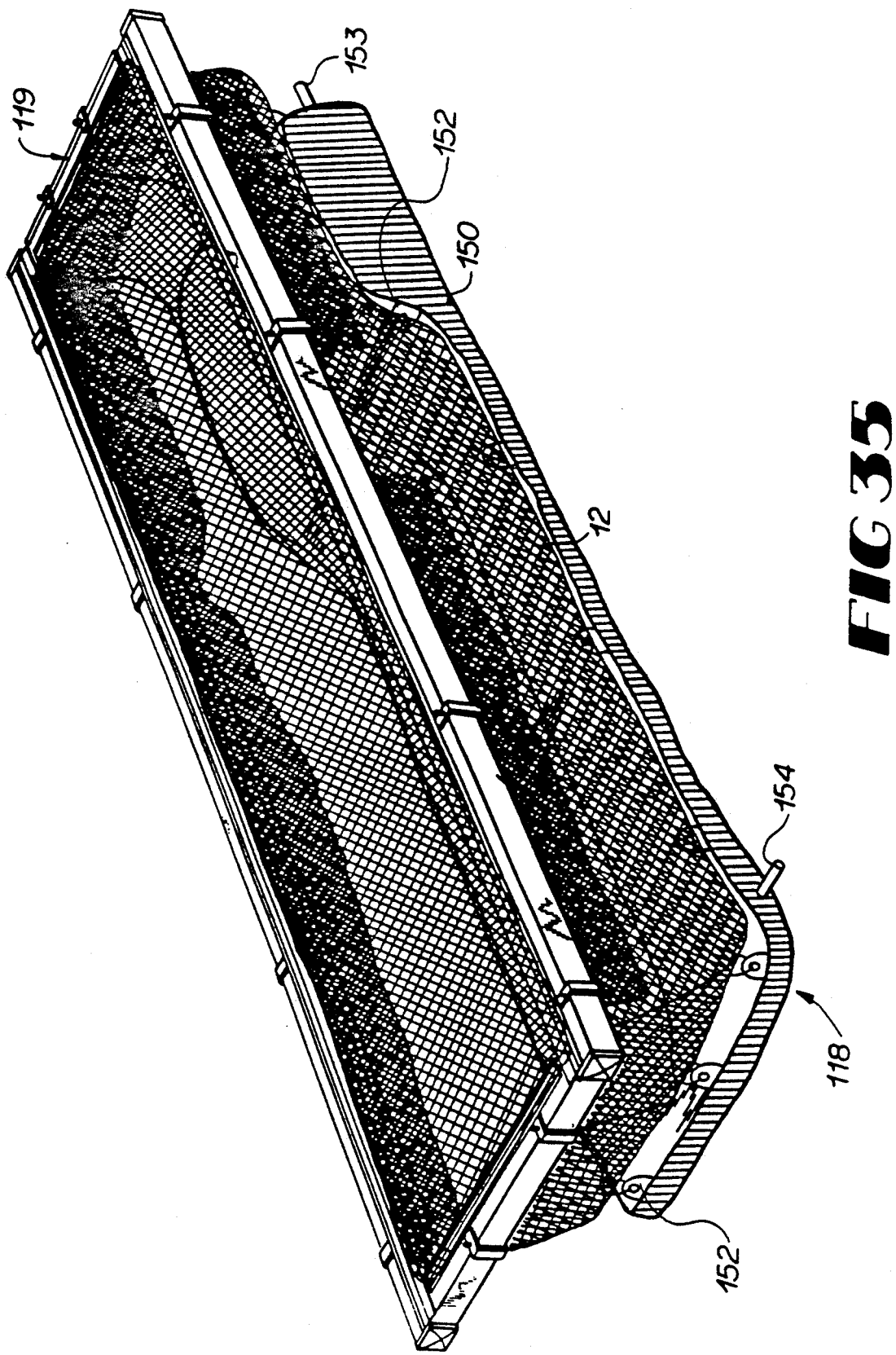
FIG. 35 is a perspective view of an alternative embodiment for the harvesting mechanism for the fish raceway apparatus shown in FIG. 1.

FIG. 35 illustrates an alternative embodiment for drawing the cage netting 12 to the surface of the water in order to draw the fish to the harvesting section 118 thereof. An air mattress 150 is provided below the cage netting 12 and is secured thereto by plastic ties that insert through a series of eyelets 152. An air inlet 153 is provided to introduce a compressed gas into the air mattress 150 at the remote end 119 of the fish raceway apparatus. An air outlet 154 is provided at the harvesting section 118 to release the compressed gas from the air mattress 150 after the fish have been harvested from the raceway apparatus. The introduction of compressed gas into the air mattress 150 at the remote end of the raceway apparatus causes the air mattress 150 to inflate and rise beginning at the remote end 119 of the mattress and continuing along the length of the raceway apparatus toward the harvesting section 118. The inflation of the air mattress 150 causes the cage netting 12 to rise toward the surface of the water and thereby causes the fish to retreat toward the harvesting section 118 of the raceway apparatus. Thus, the inflation of the air mattress 150 performs the same function as moving the roller bar 50 along the length of the raceway apparatus.

Figure 36:
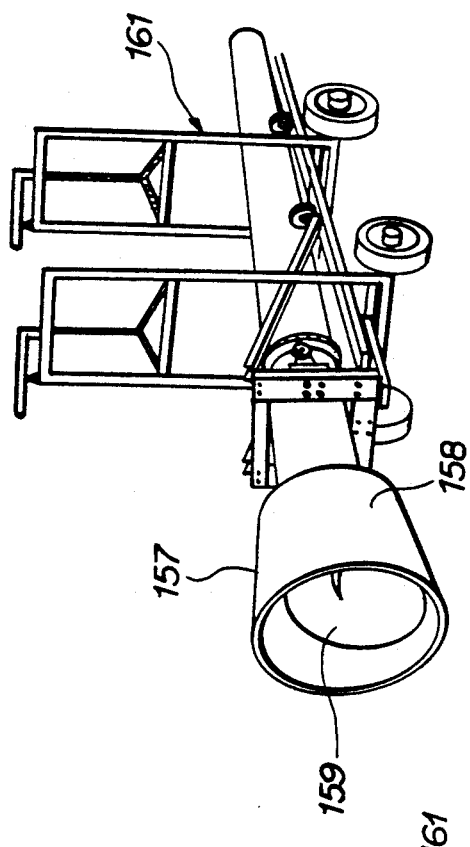
FIG. 36 is a perspective view of a fish auger used to retrieve the fish from the fish raceway apparatus of FIG. 1.
Figure 37:
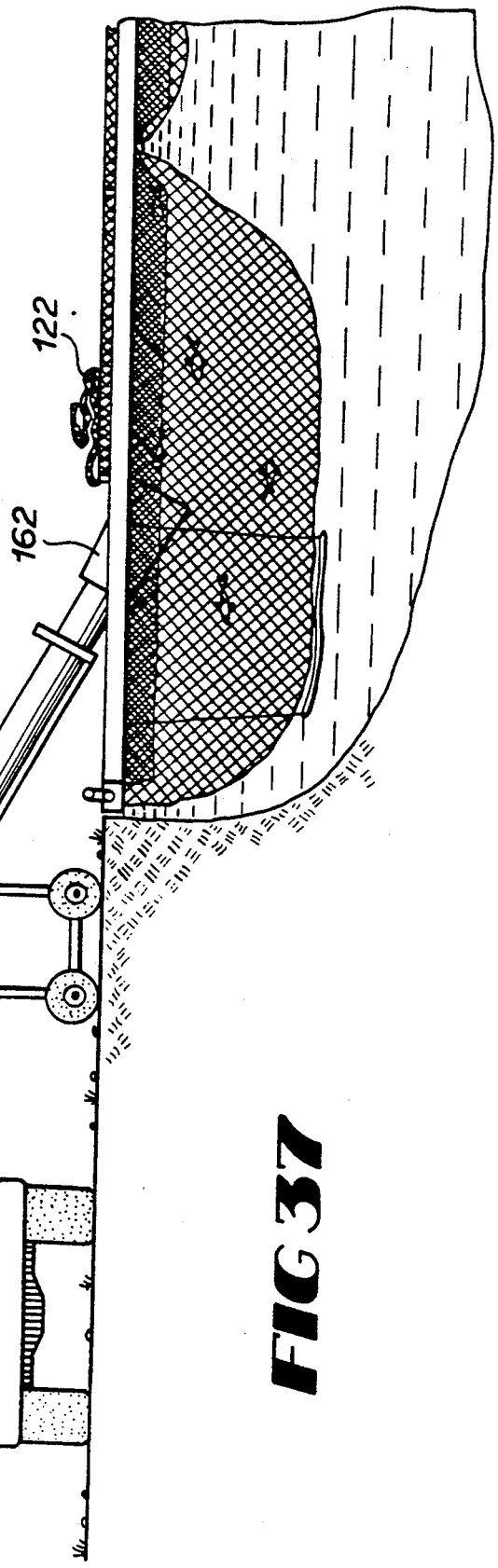
FIG. 37 is a side elevation view illustrating the fish retrieval process wherein fish are loaded from the fish raceway apparatus into a fish tank truck.

As previously mentioned, once the fish have been drawn toward the harvesting section of the raceway apparatus, the fish can be retrieved from the raceway apparatus by either conventional means, such as by use of fish nets, or by use of a fish auger, as illustrated in FIGS. 36 and 37. The fish auger 157 comprises a cylindrical shaft 158 with a broad helical flange 159 within the cylindrical casing of the shaft 158. The auger 157 is mounted onto a movable support assembly 161 that operates to raise the auger into an angular position to retrieve the fish from the raceway apparatus, as illustrated in FIG. 37. The wide end 162 of the auger is inserted through the top of the fish raceway apparatus with the top cover net 122 partially removed to provide access for the auger 157. The end of the auger opposite the wide end 162 is positioned above a fish tank truck 164. The auger 157 is rotated to draw the fish from the raceway apparatus through the auger and into the fish tank truck 164.

Figure 38:
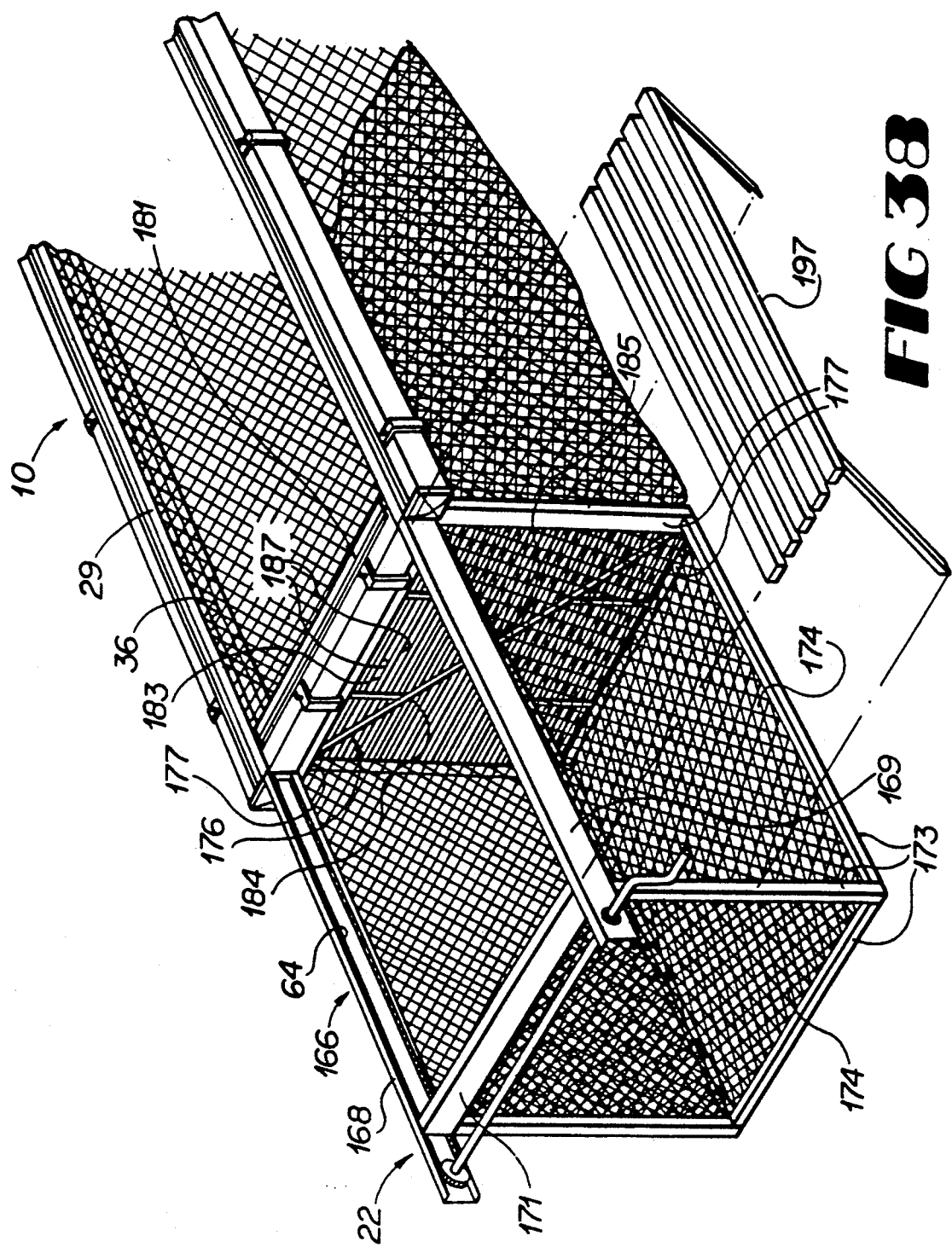
FIG. 38 is a perspective view of an alternative embodiment of the fish raceway apparatus of FIG. 1 illustrating a fish grader mechanism.

FIG. 38 is a partial perspective view of an alternative embodiment of the fish raceway apparatus wherein a grader cage 166 is mounted to the harvesting end of the fish raceway apparatus 10, to provide a means for separating large fish from small fish prior to retrieval of the fish from the raceway apparatus.

The grader cage 166 comprises side channels 168 and 169 that are simply extensions of the C-shaped guide channels 36 of the mounting bracket 29 of the main raceway apparatus. A transverse cross-channel 171 is provided to frame out the top of the grader cage 166. The harvesting end assembly 22 is mounted beyond the transverse cross-channel 17 and remains unaltered with the exception that it has been extended from the main raceway apparatus 10. Thus, the cable chain, or timing belt 64 extends along the side channels 168 and 169.

The grader cage 166 also includes rectangular framework 173 to which netting pieces 174 are secured by plastic ties, or other suitable means, (not shown).

A grader gate 176 is mounted between the grader cage 166 and the main raceway apparatus 10. The grader gate 176 includes a U-shaped track 177 open at the top for receiving within its tracks a sliding gate assembly 181. The sliding gate assembly 181 includes a series of vertically spaced cross bars 183 that are slidably received within the grooves of the U-shaped track 177. A pair of cross-arms 184 are pivotally secured together at their juncture 185 and to each cross bar 183. The gaps 187 between the vertically spaced cross bars 183 can be adjusted by pivoting the cross-arms 184 into a more upright or a more horizontal attitude.

Figure 39:
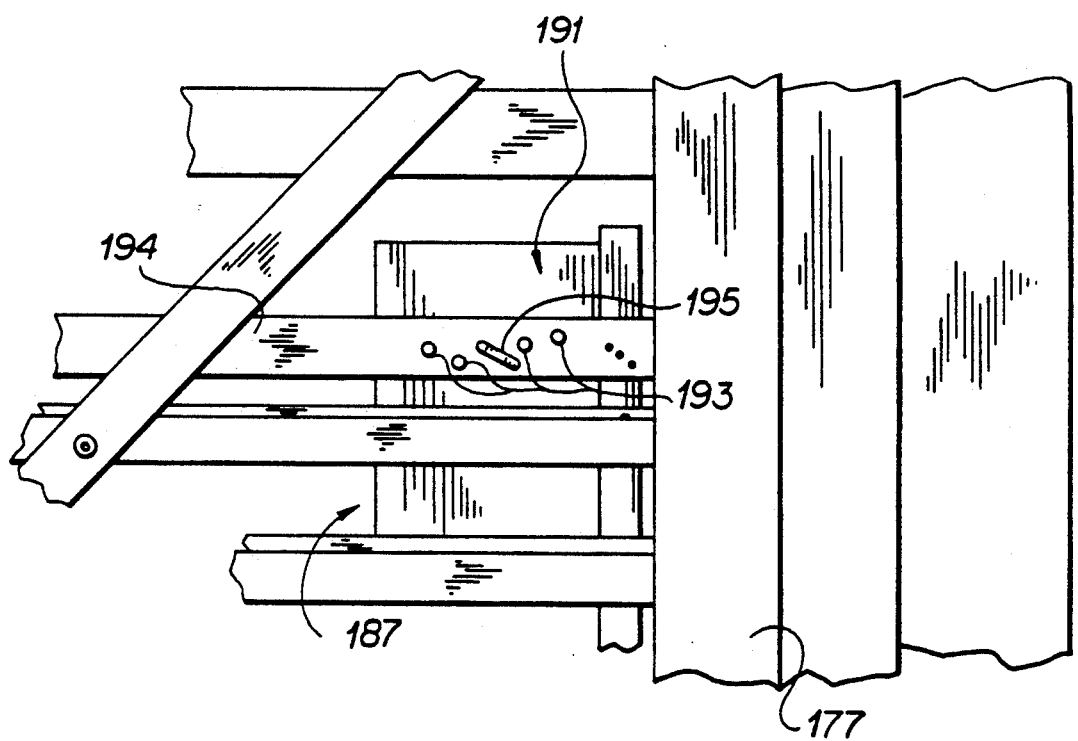
FIG. 39 is a partial side view of an adjustment mechanism for the grader mechanism of FIG. 38.

FIG. 39 details the adjustment means 191 for adjusting the size of gaps 187. A back plate 192 is mounted to the track 177 and includes a series of holes (not shown) that are aligned with holes 193 in cross bar 194. A lock pin 195 is insertable through aligned holes in cross bar 194 and the back plate 191 to hold the sliding gate assembly with a desired gap size. Adjustment of lock pin 195 in different aligned holes varies the vertical dimension of the gaps 187. As shown in FIG. 38 a platform 197 can be secured to one side of the grader cage 166 to provide a platform for an operator to reach the grader gate 176.

Referring back to FIG. 38, operation of the main raceway apparatus 10 and the grader gate 176 is as follows. An operator raises the sliding gate assembly 181 a sufficient distance, approximately one foot, and advances the harvesting roller (not shown) toward the grader cage this causes all of the fish to swim under the sliding gate assembly 181 and into the grader cage 166. The harvesting roller is then retracted and the sliding gate assembly 181 lowered, with the adjustment means 191 set to size the gaps 187 or openings between the cross bars 183 to allow fish less than a desired size to swim back through. As the "small" fish swim back through the grader gate 176 into the main raceway apparatus 10, the "large" fish remain in the grader cage 166 and can be retrieved therefrom.

The features and principles of the present invention have been illustrated in the foregoing description of a preferred embodiment thereof. It will be apparent to those skilled in the art that numerous changes or modifications may be made thereto without departure from the spirit and scope of the invention as claimed hereinafter. All such changes and modifications are intended to be incorporated herein and within the scope of the following claims.

I claim:

1. A fish raceway apparatus for raising and harvesting fish in a body of water, comprising:
   a flexible mesh cage adapted to enclose fish in a body of water, said flexible mesh cage having sufficient volume so that fish can be raised therein, said flexible mesh cage having a harvesting section at one end portion thereof,
   harvesting means for progressively closing said flexible mesh cage beginning at the other end portion thereof and continuing along said flexible mesh cage toward said harvesting section of said flexible mesh cage, at the other end portion thereof for herding the fish toward said harvesting section,
   whereby, upon operation of said harvesting means, the fish within the flexible mesh cage are herded toward and into the harvesting section wherein the fish can be retrieved from the flexible mesh cage.

2. The fish raceway apparatus of claim 1, further comprising a fish grader assembly connected to said flexible mesh cage adjacent the harvesting section thereof, said fish grader assembly comprising a fish cage and a grader means between said fish cage and the flexible mesh cage through which fish of a desired size can pass while larger fish are prevented from passing therethrough.

3. The fish raceway apparatus of claim 1, further comprising a frame for supporting said harvesting means, said flexible mesh cage being attached to said frame.

4. The fish raceway apparatus of claim 3, wherein said frame is adapted to float upon the surface of the body of water.

5. The fish raceway apparatus of claim 4, further comprising a feed skirt depending from said frame for containing floating fish feed within said frame.

6. The fish raceway apparatus of claim 4, wherein said flexible mesh cage is suspended from said frame to form an enclosure beneath said flexible mesh cage that is bounded above by the surface of the body of water.

7. The fish raceway apparatus of claim 6, wherein said harvesting means comprises a harvesting member movably mounted to said frame and means for moving said harvesting member along said frame, and wherein said flexible mesh cage is drawn above said harvesting member and adjacent to the surface of the body of water as said member moves along said frame.

8. The fish raceway apparatus of claim 2, wherein said harvesting means comprises a harvesting member movably mounted with respect to said frame and means for moving said harvesting member along said frame, for progressively reducing the cross section of successive portions of said cage.

9. The fish raceway apparatus of claim 3, further comprising a feed bottom suspended from said frame at the harvesting section for containing sinking fish feed within said flexible mesh cage.

10. The fish raceway apparatus of claim 3, further comprising a treatment tarp adapted to be placed around said flexible mesh cage to contain therein treatment solution introduced into the water within said flexible mesh cage.

11. The fish raceway apparatus of claim 10, wherein said treatment tarp includes a float means to cause said treatment tarp to conform to the shape of said flexible mesh cage.

12. The fish raceway apparatus of claim 11, wherein said means for moving said harvesting member comprises a chain and sprocket system having a crank arm at one end of said frame.

13. The fish raceway apparatus of claim 12, wherein said grader means further comprises a grader gate with openings through which fish can swim.

14. The fish raceway apparatus of claim 13, wherein the openings of the grader gate are adjustable.

15. A method for raising and harvesting fish in a body of water, comprising the steps of:
enclosing the fish in a flexible mesh cage in the body of water,
feeding said fish in said cage, deforming the flexible mesh cage to reduce the cross section beginning at one edge portion thereof, and continuing along the flexible mesh cage toward a harvesting section of a flexible mesh cage for thereby herding the fish into the harvesting section, and
retrieving the fish from the harvesting section of the flexible mesh cage.

16. The method of claim 15, wherein the flexible mesh cage includes a frame and said step of deforming the flexible mesh cage includes moving a harvesting member along the frame so that successive increments of the flexible mesh cage are progressively collapsed toward the harvesting member.

17. The method of claim 15, further comprising the step of placing an impervious treatment tarp around the flexible mesh cage and treating the water within the flexible mesh cage with a treatment solution.

18. The method of claim 15, further comprising the step of grading the fish to separate the large fish from the small fish so that fish of a particular size can be retrieved from the flexible mesh cage.

19. The method of claim 15, further comprising the step of producing a feed bottom tarp within the flexible mesh cage and feeding the fish with sinking feed that can be contained within the flexible mesh cage by the impervious feed bottom tarp.

20. The method of claim 18, wherein the step of grading the fish includes the step of directing fish of a smaller size through openings slightly smaller than the desired size so that the fish larger in size are prevented from passing through the openings.

* * * * *